(12) United States Patent
Yen

(10) Patent No.: US 12,454,274 B2
(45) Date of Patent: Oct. 28, 2025

(54) METHODS AND APPARATUSES FOR TRANSIENT FAULT DETECTION

(71) Applicant: Motional AD LLC, Boston, MA (US)

(72) Inventor: Daniel Yen, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 251 days.

(21) Appl. No.: 18/306,941

(22) Filed: Apr. 25, 2023

(65) Prior Publication Data
US 2023/0339480 A1    Oct. 26, 2023

Related U.S. Application Data

(60) Provisional application No. 63/334,769, filed on Apr. 26, 2022.

(51) Int. Cl.
*B60W 50/02* (2012.01)
*B60W 60/00* (2020.01)

(52) U.S. Cl.
CPC .... *B60W 50/0205* (2013.01); *B60W 50/0225* (2013.01); *B60W 2050/021* (2013.01); *B60W 60/0011* (2020.02)

(58) Field of Classification Search
CPC ....... B60W 50/0205; B60W 2050/021; B60W 2050/0215; B60W 50/0225; B60W 50/04; B60W 50/045; B60W 60/0011; B60W 60/0018; B60W 50/035; B60W 2050/0297; B60W 2050/022; B60W 50/029; B60W 50/023
See application file for complete search history.

(56) References Cited

U.S. PATENT DOCUMENTS

| | | | |
|---|---|---|---|
| 10,394,243 B1 * | 8/2019 | Ramezani | B60W 30/10 |
| 2012/0210160 A1 | 8/2012 | Fuhrman et al. | |
| 2019/0004827 A1 | 1/2019 | Preston et al. | |
| 2020/0288116 A1 * | 9/2020 | Uetani | H04N 17/002 |
| 2020/0361478 A1 * | 11/2020 | Sakamoto | G05B 9/02 |
| 2021/0179121 A1 * | 6/2021 | Lopez | B60W 50/038 |
| 2021/0394772 A1 | 12/2021 | Hayes et al. | |
| 2022/0144294 A1 * | 5/2022 | Benmimoun | B60W 50/029 |

OTHER PUBLICATIONS

Invitation to Pay Additional Fees and Partial International Search Report received for PCT Patent Application No. PCT/US2023/019868, mailed Jul. 31, 2023.
SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

* cited by examiner

*Primary Examiner* — Khoi H Tran
*Assistant Examiner* — Tanner L Cullen
(74) *Attorney, Agent, or Firm* — Knobbe, Martens, Olson & Bear, LLP

(57) ABSTRACT

Provided are methods for robust fault tolerant architecture, which can include methods for determining transient faults and permanent faults. Some methods described also include applying one or more fault schemes, based on the determination of transient and permanent faults. Further provided are apparatuses for robust fault tolerant architecture, which can include apparatuses having a plurality of processors and cross connectors for determining fault states. Systems and computer program products are also provided.

19 Claims, 15 Drawing Sheets

METHODS AND APPARATUSES FOR TRANSIENT FAULT DETECTION

INCORPORATION BY REFERENCE

This application claims priority to U.S. Provisional Application No. 63/334,769, filed on Apr. 26, 2022 and titled "METHODS AND APPARATUSES FOR ROBUST FAULT TOLERANT ARCHITECTURE," the disclosure of which is hereby incorporated by reference in its entirety for all purposes. Any and all applications for which a foreign or domestic priority claim is identified in the Application Data Sheet as filed with the present application are hereby incorporated by reference under 37 CFR 1.57.

BACKGROUND

With the complexity of modern processing systems, systems have been built for error tracking. However, many errors that occur are temporary, and may not require drastic action in response to the errors. In certain implementations, such as autonomous vehicles, taking actions in an attempt to rectify every temporary error would render the autonomous vehicle inoperable, as the autonomous vehicle would deploy an excessive level of safety actions.

Further, autonomous vehicles can be lacking efficient redundancy for safety critical systems, especially in light of the potential faults. Current autonomous vehicles use minimum failover units which offer limited fail-operational capabilities, and use a main processing unit that encompasses all available processing units, including shared memories and accelerators, so that any fault associated with the main processing unit will render the unit inoperable.

BRIEF DESCRIPTION OF THE FIGURES

Throughout the drawings, reference numbers are re-used to indicate correspondence between referenced elements. The drawings are provided to illustrate embodiments of the inventive subject matter described herein and not to limit the scope thereof.

DETAILED DESCRIPTION

Figure 1:
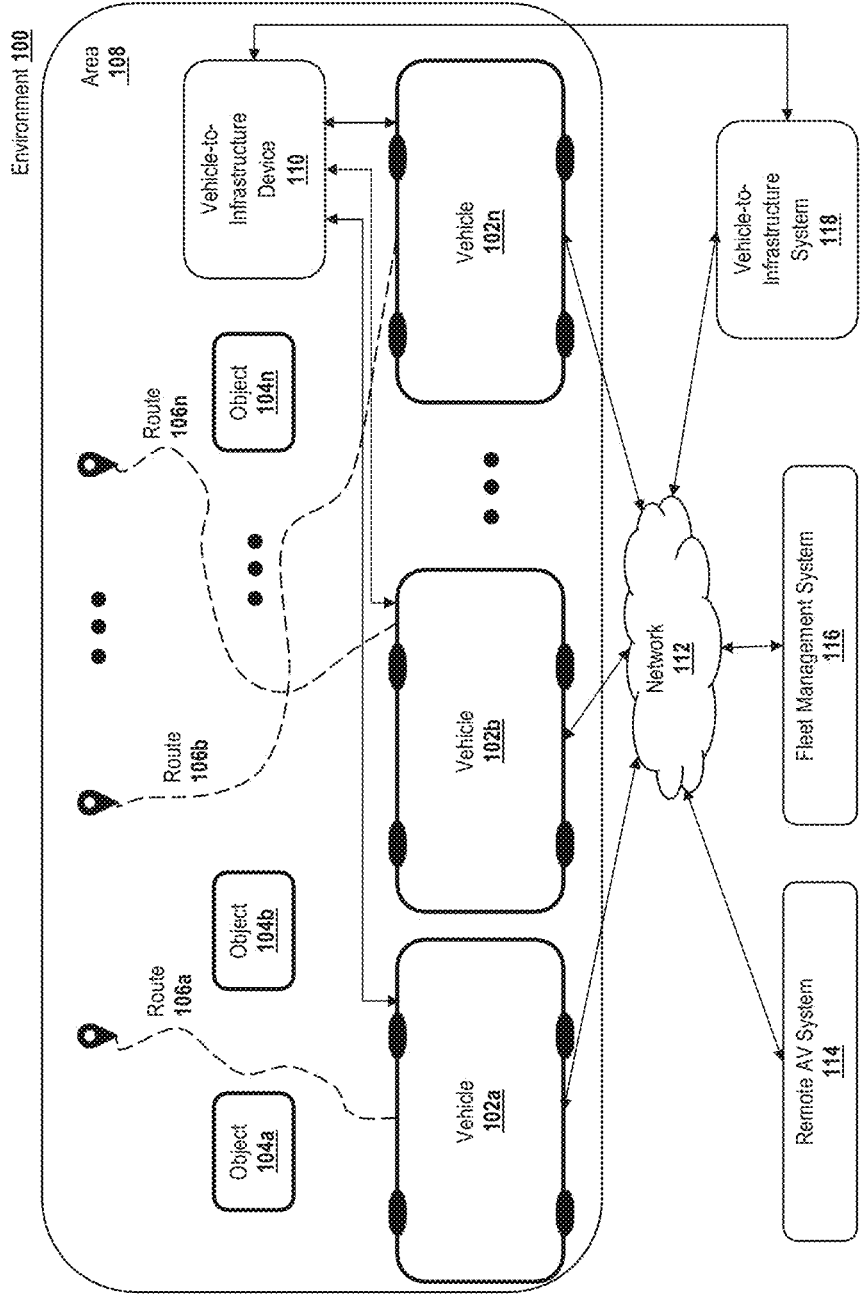
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element can not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as can be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "includes," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This can refer to a direct or indirect connection that is wired and/or wireless in nature. Additionally, two units can be in communication with each other even though the information transmitted can be modified, processed, relayed, and/or routed between the first and second unit. For example, a first unit can be in communication with a second unit even though the first unit passively receives information and does not actively transmit information to the second unit. As another example, a first unit can be in communication with a second unit if at least one intermediary unit (e.g., a third unit located between the first unit and the second unit) processes information received from the first unit and transmits the processed information to the second unit. In some embodiments, a message can refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

"At least one," and "one or more" includes a function being performed by one element, a function being performed by more than one element, e.g., in a distributed fashion, several functions being performed by one element, several functions being performed by several elements, or any combination of the above."

Some embodiments of the present disclosure are described herein in connection with a threshold. As described herein, satisfying, such as meeting, a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a method for robust fault tolerant architecture. The methods may include obtaining, using at least one processor, frame data indicative of a frame of sensor data associated with an environment within which an autonomous vehicle is operating. The methods may include processing, using the at least one processor, the frame data for determination of a trajectory parameter indicative of a trajectory of the autonomous vehicle. The methods may include determining, using the at least one processor, during the processing, whether a fault parameter or a value for the fault parameter indicative of a fault is present. In response to determining that the fault parameter indicative of a fault is present, the methods may include using the at least one processor to apply an initial fault scheme based on the fault parameter. Further, the methods may include reprocessing the frame data for determination of a secondary trajectory parameter indicative of a second trajectory of the autonomous vehicle. The methods may include, determining during the reprocessing, whether the fault parameter indicative of a fault is present.

By virtue of the implementation of systems, methods, and computer program products described herein, techniques for robust fault tolerant architecture are provided. Some of the advantages of these techniques include improving the determination and handling of transient faults. A determination of a transient fault, and the subsequent lack of a fault upon reprocessing, can advantageously lead to an avoidance of drastic safety measures (e.g., ceasing operation of the autonomous vehicle or causing the vehicle to pull over), and improve operation of an autonomous vehicle. Further, the techniques can allow for the handling of minor errors without taking major responses by the autonomous vehicle. An additional advantage of these techniques includes improving the efficiency of confirming and isolating permanent faults.

In some aspects and/or embodiments, systems, methods, and computer program products described herein include and/or implement an apparatus for robust fault tolerant architecture and/or for improved redundancy for safety critical AV applications. The apparatus may include a plurality of processors. In some cases, the plurality of processors may include at least three processors (e.g., a first processor, a second processor, and a third processor). The apparatus may further include a cross connector communicatively coupled to a plurality of sensors, the first processor, the second processor, and the third processor. The first processor may receive or be configured to receive a sensor input from at least one sensor of the plurality of sensors. This sensor data may be associated with an environment, e.g. in which an autonomous vehicle operates. The third processor may determine or be configured to determine that the first processor is in a fault state. In response to a determination that the first processor is in a fault state, the third processor may route or be configured to route the sensor input to the second processor.

By virtue of the implementation of systems, methods, and computer program products described herein, techniques for robust fault tolerant architecture are provided. Some of the advantages of these techniques may include improving the redundancy for safety critical AV applications, which in turn can result in improved security of the AV and enable operating the AV even in case of faults occurring in critical parts of the AV processing operation time of the AV. Further, a minimum risk maneuver, e.g., by failover device/unit, can be avoided resulting in continued operation of the AV. Further, the techniques can enable or maintain safety-critical processing and prioritized even in the case of an occurrence of faults occurring in processors performing the safety-critical processing. Further, a more robust and faster hardware architecture may be provided.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 can include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

Figure 6:
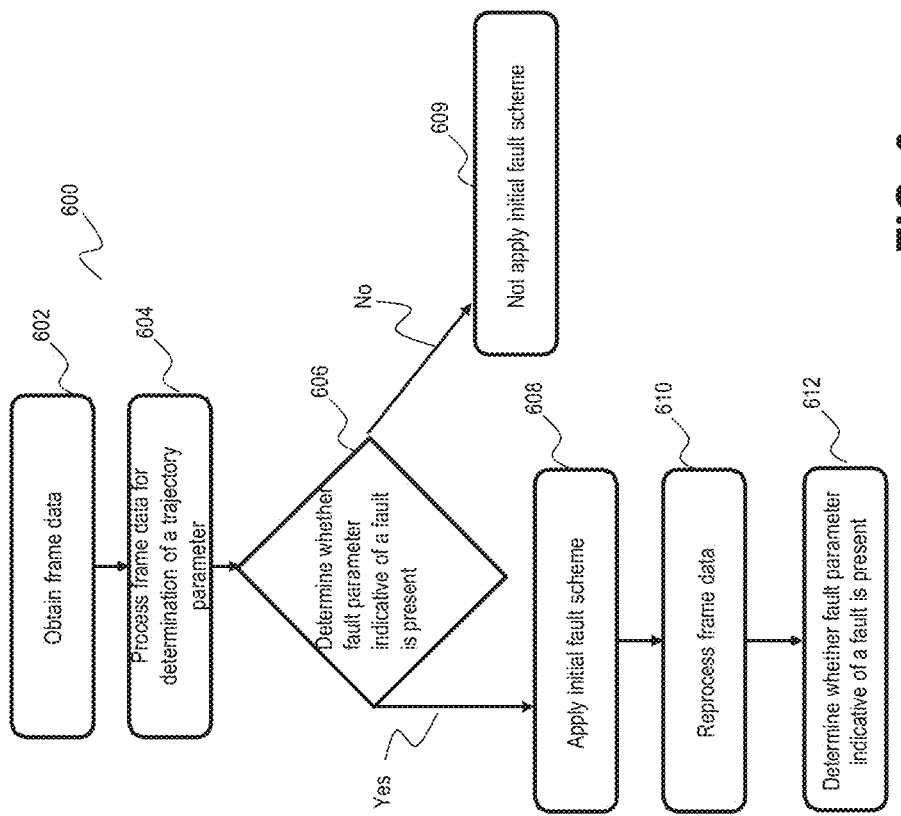
FIG. 6 is a flowchart of an example process for robust fault tolerant architecture.
Figure 8:
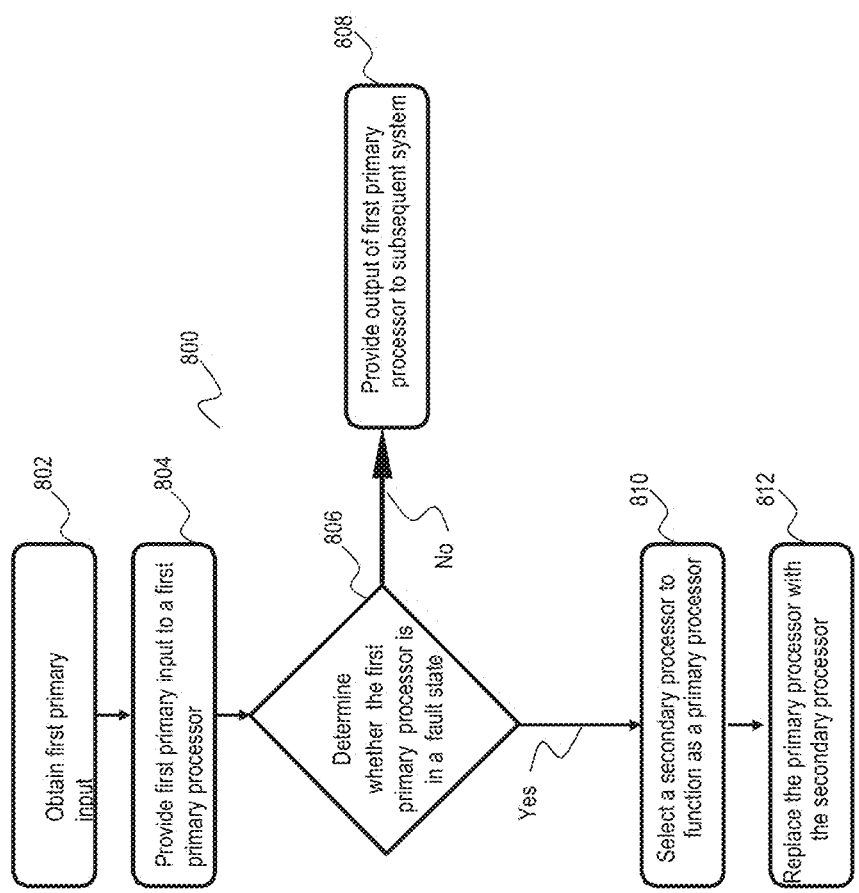
FIG. 8 is a flowchart of an example process for robust fault tolerant architecture.

In some embodiments, device 300 is configured to execute software instructions of one or more steps of the disclosed method, as illustrated in FIG. 6 and FIG. 8.

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
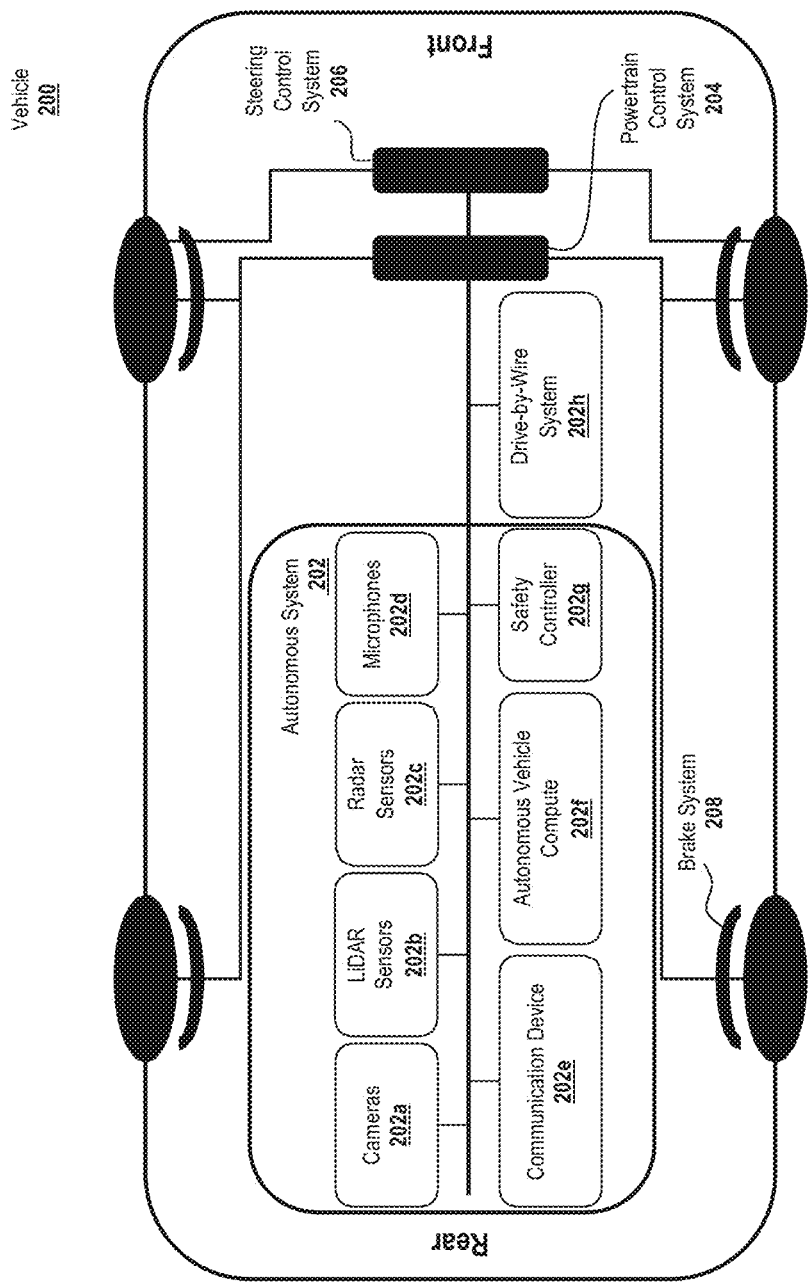
FIG. 2 is a diagram of one or more example systems of a vehicle including an autonomous system.

Referring now to FIG. 2, vehicle 200 (which can be the same as, or similar to vehicle 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference can be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
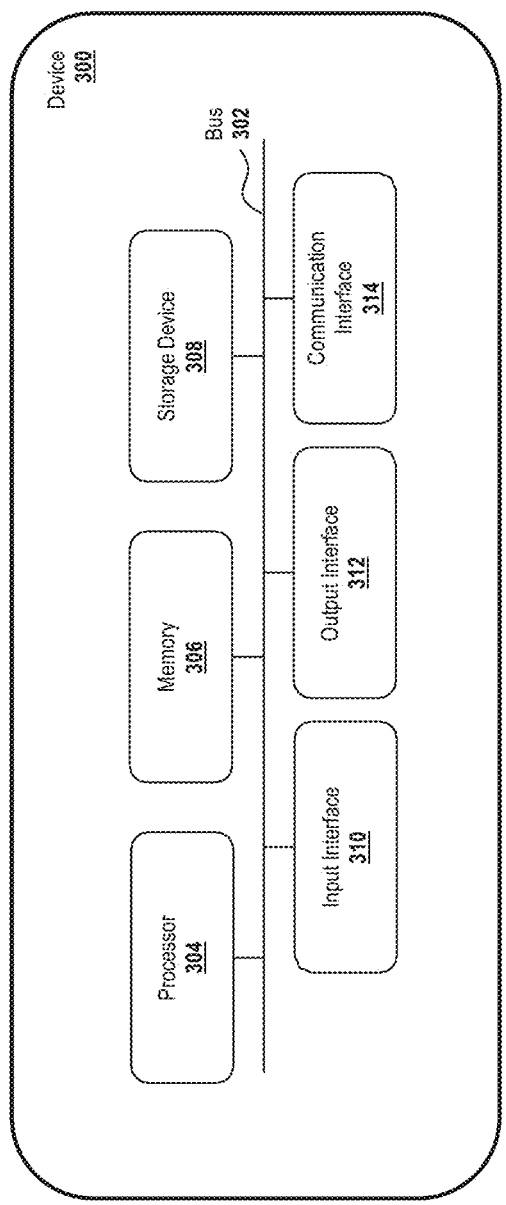
FIG. 3 is a diagram of components of one or more example devices and/or one or more example systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data can specify at least one parameter (e.g., image characteristics such as exposure, brightness, etc., an image timestamp, and/or the like) corresponding to the image. In such an example, the image can be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e can include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle software and/or hardware 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 make longitudinal vehicle motion, such as to start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate. In other words, steering control system 206 causes activities necessary for the regulation of the y-axis component of vehicle motion.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 can be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, fleet management system 116, V2I system 118, and/or one or more devices of network 112 (e.g., one or more devices of a system of network 112). In some embodiments, one or more devices of vehicles 102 (e.g., one or more devices of a system of vehicles 102 such as at least one device of remote AV system 114, fleet management system 116, and V2I system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
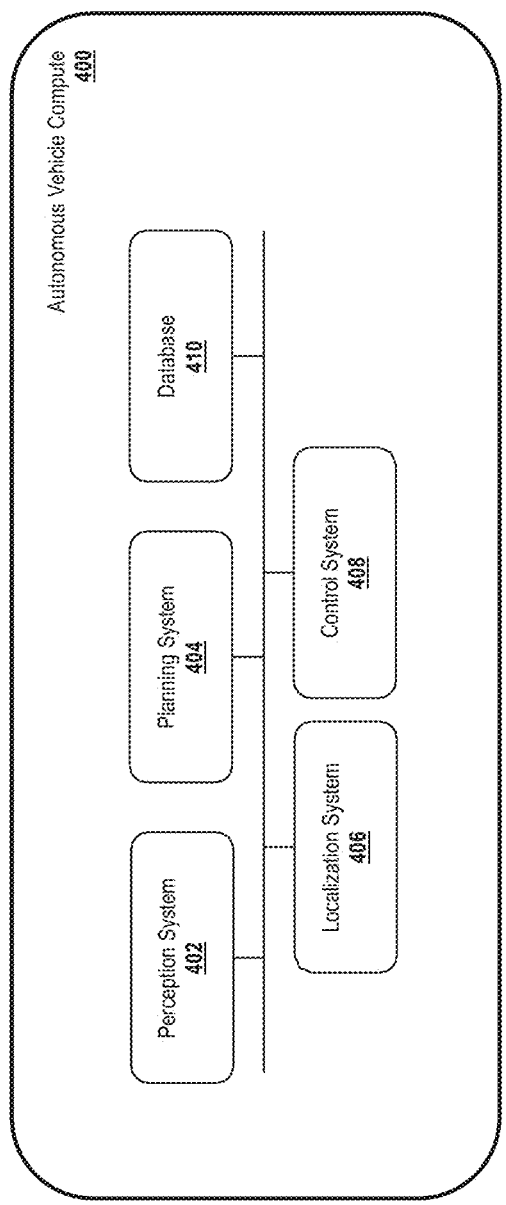
FIG. 4 is a diagram of certain components of an example autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 can perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like. In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one Li DAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

The present disclosure relates to systems, methods, and computer program products that provide for robust fault tolerant architecture and methodology. The fault tolerant architecture may be directed to, but not limited to, safety critical autonomous vehicle applications. For example, the systems, methods, and computer program products provide for a determination of transient and permanent faults during analysis of sensor output, such as frame data from a sensor output. The frame data may be a snapshot of the data obtained from the sensor at a particular point in time or over a particular time period. Further, the frame data may depend on the type of sensor. For example, the frame data may be an image from of an image sensor (e.g., a camera) or a frame from a LiDAR sensor. Further, a transient fault may be a fault that lasts for a particular period of time (e.g., within one frame). In some cases, the transient fault may be a false positive. In other cases, the transient fault may be a temporary error, such as an error in an error check code, a failed cycle redundancy check, or a memory interface parity error. In contrast, a permanent fault may be a fault that remains permanently or for more than a threshold period of time. A permanent fault may require the autonomous vehicle to stope operating, to operate at reduced capability, to attempt to safely pull over, or to otherwise be addressed before continuing operation or operation within normal operating parameters.

Determining a fault characteristic (e.g., transient v. permanent) may include suspending trajectory actions of the autonomous vehicle and retaining output values at different modules of the system while repeating the analysis of or calculation based on the sensor output. If the fault does not occur again, the previous fault can be determined as a transient fault and the autonomous vehicle may continue to operate. In some cases, the transient fault is discarded as, for example, a false positive. In other cases, the transient fault may be logged or applied to a neural network to reduce instances of the transient faults or to determine whether modifications to the AV or AV compute may lead to reduced occurrence of faults. If the fault persists, the previous fault can be determined as a permanent fault. Upon determination of a permanent fault, safety countermeasures can be deployed, such as the system entering a safe state. The system can then be configured to isolate the fault.

A transient (e.g., temporary) fault can be considered a fault that can occur during a particular processing instance or window, but may not reoccur in a subsequent processing window. For example, if the particular processing was performed again, the transient fault would not occur. A transient error is an error that may last on the order of milliseconds or less. It should be understood that transient faults may repeat in future time windows, but not necessarily consistently. Transient faults may not require action or drastic action (e.g., action that suspends or reduces operation of the vehicle or operation relating to safe movement of the vehicle) by the system to rectify the fault because, for example, the fault may be automatically addressed or may not repeat. On the other hand, a permanent (e.g., non-transient) fault can be considered a fault that occurs repeatedly (e.g., persists) within a particular processing window or that is not automatically resolved. For example, if the particular processing was performed again, the permanent fault would again occur or would remain occurring. A permanent error may not always be permanent, but it may be an error that lasts for more than a threshold period of time potentially leading to unsafe operation. Although not all permanent faults may be safety related to interrupt safe operation of the vehicle, some permanent faults may and thus, may cause or require the autonomous vehicle to cease operating, operate at reduced capability, or attempt to safely pull over to prevent potential unsafe operation.

In particular, the present disclosure relates to systems, methods, and computer program products that use time multiplexing based on input frame data. An error detected during the execution of the current frame will trigger: completing executing (e.g., processing) of the current frame data; retaining output values achieved during the executing; and suspending trajectory execution at the vehicle interface. The disclosure then allows for repeating execution of the current frame data for determination of whether the fault is a transient or permanent (e.g., non-transient) fault. If the same fault is detected, it may be determined that a permanent fault has occurred and corresponding safety mechanisms may be deployed. If no fault is detected, the fault may be determined to be a transient fault and the system can complete execution of the current frame data and resume operation and/or trajectory execution. In some cases, the memory 306 may store a plurality of frame data corresponding to a plurality of processing windows. For example, the memory 306 may store frame data for 3, 5, or 10 windows, or any other number of processing windows. In some embodiments, the process may include repeating execution of previously stored frame data from prior processing windows. If the output generated from the previously stored frame data matches the output from when the previously stored frame data was processed, it may be determined that the fault was a transient fault. Otherwise, it may be determined that the fault is a permanent fault.

Referring now to FIGS. 5A-5E, illustrated is a diagram of an implementation of a process for robust fault tolerant architecture, embodied by system 500. The system 500 may be an example of a portion of a control system (e.g., AV compute 400) for controlling an autonomous vehicle 100. In some embodiments, the system 500 includes an AV compute 540 which is the same as or may implement one or more of the previously described embodiments for a compute system, such as autonomous system 202 of FIG. 2), AV compute 202f of FIG. 2, remote AV system 114 of FIG. 1, AV software 400, and/or a fleet management system (e.g., a fleet management system that is the same as or includes one or more of the embodiments described with respect to the fleet management system 116 of FIG. 1). In some embodiments, the AV compute 540 may be a trajectory processing system configured to determine a trajectory of an autonomous vehicle or one or more trajectory parameters used by a controller of the autonomous vehicle to determine the trajectory. Further, the system 500 and/or the AV compute 540 may be part of an autonomous vehicle, such as autonomous vehicle 200 discussed with respect to FIG. 2. In one or more embodiments or examples, the AV compute 540 may be part of the system 500. The AV compute 540 and/or the system 500, for example, may be or may include one or more processors (such as processor 304 shown in FIG. 3).

In one or more embodiments or examples, the at least one processor described herein can be implemented as a system on a chip (SoC) or a plurality of SoCs. In one or more embodiments or examples, the AV compute 540 can include one or more SoCs. Each SoC can include one or more chiplets. Each SoC can include a plurality of chiplets. A processor can be a chiplet. The chiplets can, individually or in combination, coordinate to perform one or more operations (e.g., perception planning via perception system 402, localization via localization system 406, control via control system 408).

For purposes of illustration, the following description of the system 500 for robust fault tolerant architecture will be with respect to an implementation of this process by autonomous vehicle compute 540 (which can be the same as, or similar to, autonomous vehicle software 400 of FIG. 4). However, it will be understood that in some examples the system 500 (e.g., one or more elements of the system 500) is implemented by other systems different from, or in addition to autonomous vehicle compute 540 such as an AV (e.g. illustrated in FIG. 2), an autonomous system (e.g., a system that is the same as, or similar to, autonomous system 202 of FIG. 2), a remote AV system (e.g., a remote AV system that is the same as, or similar to, remote AV system 114 of FIG. 1), and/or a fleet management system (e.g., a fleet management system that is the same as, or similar to, fleet management system 116 of FIG. 1).

The AV compute 540 can utilize robust fault tolerant architecture in any and/or all systems of the autonomous vehicle compute 400 shown in FIG. 4, such as the perception system 402, the planning system 404, the localization system 406, the control system 408, and the database 410.

As used herein, when the system 500 is configured to take a certain action, it can be understood as meaning that an at least one non-transitory computer readable medium of the system is storing instructions that, when executed by the at least one processor, cause the at least one processor to perform operations including the action.

Disclosed herein is a system 500. The system 500 includes at least one processor. The at least one processor can be, for example, AV compute 540, or another processor in the system 500. In one or more embodiments or examples, the system 500 includes at least one non-transitory computer readable medium storing instructions that, when executed by the at least one processor, cause the at least one processor to perform operations including obtaining frame data 510 indicative of a frame of sensor data associated with an environment within which an autonomous vehicle is operating. The frame of sensor data may refer to any type of delineation of the sensor data in space, time, or otherwise. For example, the frame of the sensor data may refer to sensor data obtained at a particular instance of time. For instance, a first frame of sensor data may be at time to and a second frame of sensor data may be at time ti, etc. In some cases, the frame data may be instantaneous data. In other cases, the frame data may include data over a time period. For example, each frame of data may include 5, 7, 10, 15, or 30 milliseconds of sensor data, or any amount in between, lesser, or greater than the preceding examples. Further, the environment may refer to any operational environment within which an autonomous vehicle may operate, such as the environment 100. For example, the environment may be a road network, parking facility, private lot, or the like.

In one or more embodiments or examples, the system 500 includes at least one non-transitory computer readable medium storing instructions that, when executed by the at least one processor, cause the at least one processor to perform operations including processing the frame data 510 for determination of a trajectory parameter 514 indicative of a trajectory of the autonomous vehicle. The trajectory parameter 514 may include any type of parameter that indicates or that is used to control a trajectory or direction of a vehicle (e.g., the autonomous vehicle 200). For example, the trajectory parameter 514 may relate to a speed, direction, or acceleration of the vehicle, an obstacle, a road network, an environmental condition, or any other factor that may affect operation or movement of the vehicle. In one or more embodiments or examples, the system 500 includes at least one non-transitory computer readable medium storing instructions that, when executed by the at least one processor, cause the at least one processor to perform operations including determining during the processing, whether a fault parameter 512 indicative of a fault is present. In one or more embodiments or examples, in response to determining that the fault parameter 512 is indicative of a fault being present, the processor performs operations including applying or executing an initial fault scheme. The initial fault scheme may be selected or performed based at least in part on the fault parameter 512. In one or more embodiments or examples, in response to determining that the fault parameter 512 is indicative of a fault being present, the processor performs operations including reprocessing the frame data 510 for determination of a secondary trajectory parameter 514A indicative of a second trajectory of the autonomous vehicle. In one or more embodiments or examples, in response to determining that the fault parameter 512 is indicative of a fault being present, the processor performs operations including determining during the reprocessing, whether the fault parameter 512 indicative of a fault is present. In other words, upon detection of a fault, the processor may perform operations on the frame data a second time. If the fault is determined to still be present during the second occurrence of processing the frame data, it may be determined that the fault is likely a permanent fault. If the fault is determined to not be present during the second occurrence of the processing the frame data, it may be determined that the fault is likely a transient or temporary fault.

In one or more embodiments or examples, in response to determining that the fault parameter 512 is not indicative of a fault being present, the processor performs operations including not applying or ceasing to apply an initial fault scheme based on the fault parameter 512. In one or more embodiments or examples, in response to determining that the fault parameter 512 is not indicative of a fault being present, the processor performs operations including not reprocessing the frame data 510 for determination of a secondary trajectory parameter indicative of a second trajectory of the autonomous vehicle. In one or more embodiments or examples, in response to determining that the fault parameter 512 is not indicative of a fault being present, the processor performs operations including not determining during the reprocessing, whether the fault parameter indicative of a fault is present. In one or more examples, in response to determining that the fault parameter 512 is not indicative of a fault being present, the processor performs operations including operating, based on the trajectory parameter, the autonomous vehicle. For example, if the system 500 determines that there are no fault parameters indicative of a fault being present, the system 500 can operate the autonomous vehicle as normal or within normal operating parameters as specified by the designer or manufacturer of the autonomous vehicle.

In one or more embodiments or examples, system 500 is configured to obtain sensor data, such as from a sensor 502. The sensor data can be one or more of: radar sensor data, non-radar sensor data, camera sensor data, image sensor data, audio sensor data, and LIDAR sensor data. The sensor data is associated with an environment an autonomous vehicle is operating in. For example, the sensor data is indicative of an object, and/or a plurality of objects, in the environment around an autonomous vehicle.

The sensor 502 can be a single sensor or may include a plurality of sensors. In one or more embodiments or examples, the sensor 502 is associated with the autonomous vehicle. The sensor 502 can be one or more of: a radar sensor, a non-radar sensor, a camera sensor, a microphone, an infrared sensor, an image sensor, and a LIDAR sensor. In one or more embodiments or examples, the sensor 502 is one or more of the sensors illustrated in FIG. 2.

In one or more embodiments or examples, from the sensor data, the system 500 is configured to obtain (e.g., determine) frame data 510. Frame data 510 can be a portion (e.g., a single frame, segment, frame) of the sensor data. Further, as described herein, the frame data 510 may be associated with a particular time period or may be instantaneous data obtained at a particular point in time.

In one or more embodiments or examples, the system 500 is configured to process the frame data 510 to determine the trajectory parameter 514 (e.g., trajectory data), which can be used for operation of the autonomous vehicle. The system 500 can process the frame data 510 (such as frame(n)) at a particular time (time(n)) to generate the trajectory parameter 514. The processing can be performed by the AV compute 540, such as for any one of the systems 402, 404, 406, 408, 410 discussed with respect to the AV software 400 of FIG. 4. In one or more embodiments or examples, the system 500 transmits the trajectory parameter 514 to control system 508, which can include any or all of the components discussed with respect to control system 408 in FIG. 4, such as via a vehicle interface. The processing can be performed in a processor 516A, 516B, 516C (e.g., a plurality of processors) of the AV compute 540. The processors 516A, 5168, 516C may individually or collectively be referred to as the processor 516 or processors 516. In some embodiments, the processors 516 can be one or more of the processors 716 or 718 described in more detail below and/or can include one or more of the embodiments described with respect to the processors 716 or 718. The processing can be or can include any processing action taken by the system 500. The processing can be in a processing pipeline. In one or more embodiments or examples, processing and/or reprocessing includes performing tasks (e.g., segmenting frame data 510, analyzing frame data 510, determining faults). In one or more embodiments or examples, the system 500 provides the trajectory parameter 514 to a drive-by-wire system (e.g., 202*h*) of a vehicle (e.g., vehicle 102).

In one or more embodiments or examples, during processing, the system 500 is configured to determine whether a fault parameter 512 indicative of a fault (e.g., error, failure, problem, disconnect, fault state) is present. Due to the complexity of the system 500, one or more faults can be present during the processing of the frame data 510. In one or more embodiments or examples, a fault parameter 512 is a fault flag (e.g., fault indicator, fault data). In some cases, the fault parameter may be associated with a particular processor 516 indicating where the fault occurred. In other cases, the fault parameter 512 may not indicate the fault location, or the fault may be caused by an earlier processor in a processor chain than the processor that caused the fault parameter to be triggered.

In some embodiments, determination of presence of a fault and/or determination that a fault parameter indicates a presence of a fault may be performed by one or more of the processors 516. In some cases, a processor subsequent to the processor that generates the fault detects the fault. For example, if the fault is associated with the processor 516A, one or more of the processors 516B or 516C may detect the fault. In some embodiments, the control system 508 or the fault manager 520 (illustrated in FIG. 5E) may detect the presence of the fault or that the fault parameter 512 indicates a fault. In some cases, the processor 516 that generates the fault may also detect the presence of the fault. In some embodiments, the fault may be detected by a controller, such as the controller 750 illustrated in FIG. 7B.

Figure 5A:
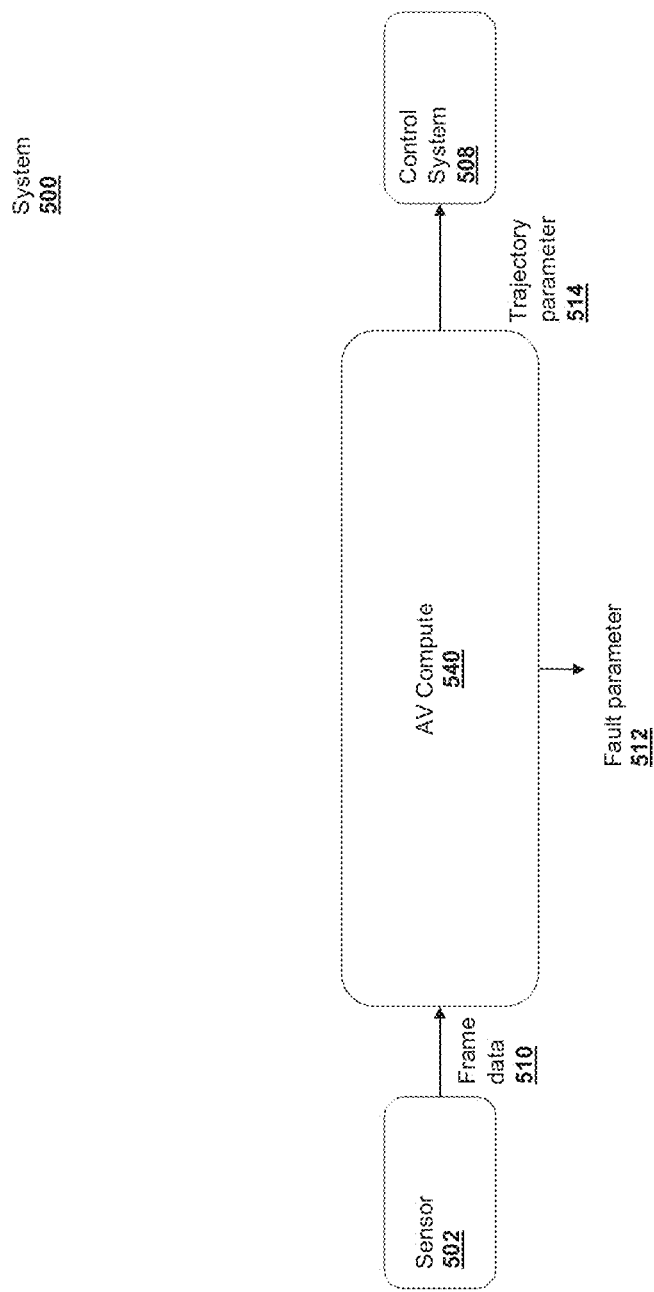
FIGS. 5A-5E are diagrams of an example implementation of a process for robust fault tolerant architecture.
Figure 5B:
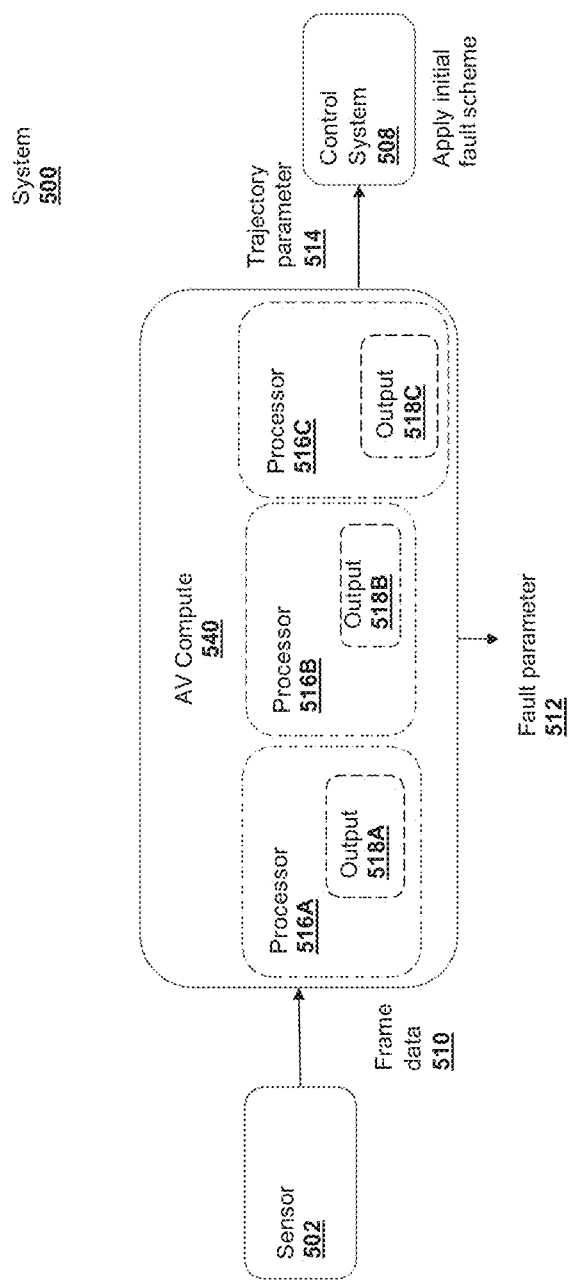

In one or more embodiments or examples, in response to determining that the fault parameter is indicative of a fault being present, the system 500 is configured to apply, based on the fault parameter 512, an initial fault scheme as shown in FIG. 5B. In one or more embodiments or examples, applying the initial fault scheme includes suspending operation of the autonomous vehicle along the trajectory parameter. In some embodiments, applying the fault scheme may include suspending processing of certain operations by the AV 540, while permitting the autonomous vehicle (AV) to continue at its present trajectory. In some such cases, the AV may continue operating or driving at its current trajectory for a particular amount of time, which may correspond to a particular number of frames of sensor data. For example, the AV may continue to operate for an amount of time corresponding to up to 5, 10, 15, frames of data or any amount in between, lesser, or greater than the preceding examples. If it is determined that the fault continues or is likely to continue for longer than the permitted operating time, the AV may take execute additional fault procedures, such as causing the AV to attempt to safely pull over to the side of the road. It should be understood that the amount of time the AV is permitted to continue travelling along a trajectory or operate may depend on context, such as speed of operation, location, type of fault, and the like.

In one or more embodiments or examples, applying the initial fault scheme includes storing output data of the at least one processor performing the processing and reprocessing. Accordingly, the autonomous vehicle will not operate along the trajectory parameter until the suspension is lifted. This can advantageously prevent the autonomous vehicle from operating along a trajectory that was made in error due to the fault. Further, any processor output data (e.g., outputs 518A, 518B, 518C) can be stored. In some cases, the autonomous vehicle may continue to operate along the trajectory or using the trajectory parameter associated with the most recent non-fault based determination.

In one or more embodiments or examples, the system 500, based on the initial fault scheme, is configured to finish any processing of the frame data 510 and/or store (e.g., hold, retain) the frame data 510 in a buffer and/or memory (e.g., memory 306 of FIG. 3). Further, in some examples, based on the initial fault scheme, the system 500 retains outputs 518A, 518B, 518C of the respective processors 516A, 516B, 516C from processing the frame data 510. The retained output values can be at major interfaces within the AV compute 540.

As mentioned, in one or more embodiments or examples, in response to determining that the fault parameter is indicative of a fault, such as a fault in or caused by one or more processors 516A, 516B, 516C, being present, the system 500 is configured to reprocess the frame data 510. Reprocessing can include repeating analysis and/or reanalyzing the frame data 510. Reprocessing can be the same action as processing. The system 500 can be configured to re-obtain the frame data 510 from the sensor 502. The system 500 can store the frame data 510, such as in the AV compute 540. In one or more embodiments or examples, the system 500 can determine during the reprocessing whether the fault parameter is indicative of a fault being present. Accordingly, the system 500 is configured to recheck, via the reprocessing, the frame data 510. This, in certain examples, allows for the system 500 to determine whether a fault is a transient fault or a permanent fault. For example, the reprocessing allows for the determination of transient faults, which might occur during the initial processing, but not during the reprocessing. In one or more embodiments or examples, the system 500 is configured to roll over transient faults, such as by ignoring and/or discarding these types of faults, with minimum disruption to the system 500 execution and performance. In some such cases, the system 500 may not take any significant actions, or any further actions, to resolve the transient fault. In some embodiments, instead of or in addition to reprocessing frame data 510 that is associated with a fault, the system 500 may process frame data associated with a prior frame (e.g., a most recent frame) that produced an output not associated with a fault. The system 500 can determine during reprocessing of frame data not associated with a fault whether a fault is triggered during reprocessing. In some cases, it can be determined whether a fault is a transient fault or an indication of a non-transient fault by determining whether previously processed data that did not previously trigger a fault during initial processing triggers a fault during reprocessing by determining whether the output is consistent or inconsistent with prior processing.

Figure 5C:
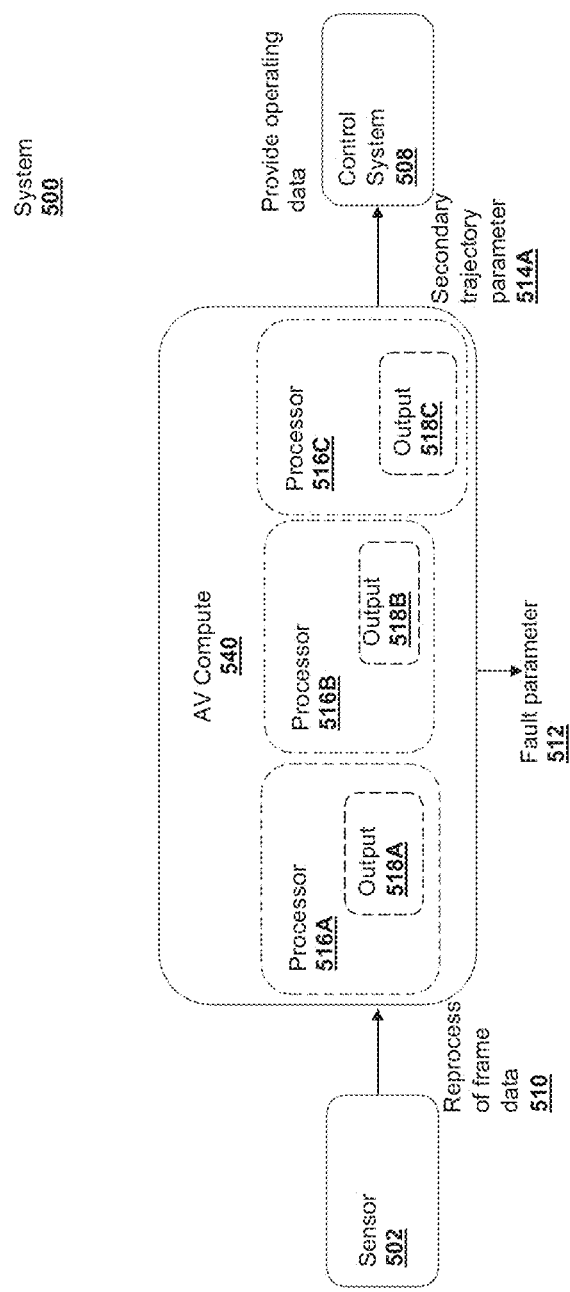

In one or more embodiments or examples, in response to determining that the fault parameter 512 indicative of a fault is not present during the reprocessing, the system 500 is configured to provide, based on the trajectory parameter 514 or the secondary trajectory parameter 514A, operating data to cause operation of the autonomous vehicle. This is shown in FIG. 5C. In other words, as the system 500 determines that the fault parameter 512 indicative of a fault is not present during reprocessing, it can be determined that the previous fault is or is likely a transient fault. In some such cases, the system 500 can be configured to discard this transient fault and provide operating data to the control system 508 to cause operation of the autonomous vehicle. Further, as an example, the system 500 un-suspends or resumes the control system 508 from operating the autonomous vehicle, thereby allow for operation to resume.

The system 500 providing operating data to cause operation of the autonomous vehicle can include generating control data for a control system 508 of the autonomous vehicle, transmitting control data to a control system of an autonomous vehicle, and/or transmitting control data to an external system.

In one or more embodiments or examples, providing the operating data to cause operation of the autonomous vehicle includes determining, based on the trajectory parameter, whether the secondary trajectory parameter 514A meets a trajectory criterion. In one or more embodiments or examples, providing the operating data to cause operation of the autonomous vehicle includes, in response to determining that the secondary trajectory parameter 514A meets the trajectory criterion, providing, based on the secondary trajectory parameter 514A, the operating data to cause operation of the autonomous vehicle. In one or more embodiments or examples, providing the operating data to cause operation of the autonomous vehicle includes, in response to determining that the secondary trajectory parameter 514A does not meet the trajectory criterion, providing, based on the trajectory parameter 514, operating data to cause operation of the autonomous vehicle. For example, the system 500 determines whether the secondary trajectory parameter 514A meets the trajectory criterion of the secondary trajectory parameter 514A being a certain number of pixel differences from the trajectory parameter 514. If the system 500 determines that the secondary trajectory parameter 514A satisfies the trajectory criterion (e.g., has greater than a particular number of pixel differences from the trajectory parameter 514), the system 500 is configured to provide operating data based on the secondary trajectory parameter 514A, as the fault can have affected the trajectory parameter 514A. However, if the system 500 determines the secondary trajectory parameter 514A does not satisfy the trajectory criterion (e.g., has less than or equal to a particular number of pixel differences from the trajectory parameter 514), the system 500 is configured to provide operating data based on the trajectory parameter 514 as both the trajectory parameter 514 and secondary trajectory parameter 514A can be viable due to the lack of interference by the fault. This determination can allow for some fault tolerance for the difference between the trajectory parameter 514 and the secondary trajectory parameter 514A, such as by allowing a particular number (e.g., 1, 2, 3, 4, 5, 6, 7, 8, 9, or 10) pixel differences between the secondary trajectory parameter 514A and the trajectory parameter 514.

Figure 5D:
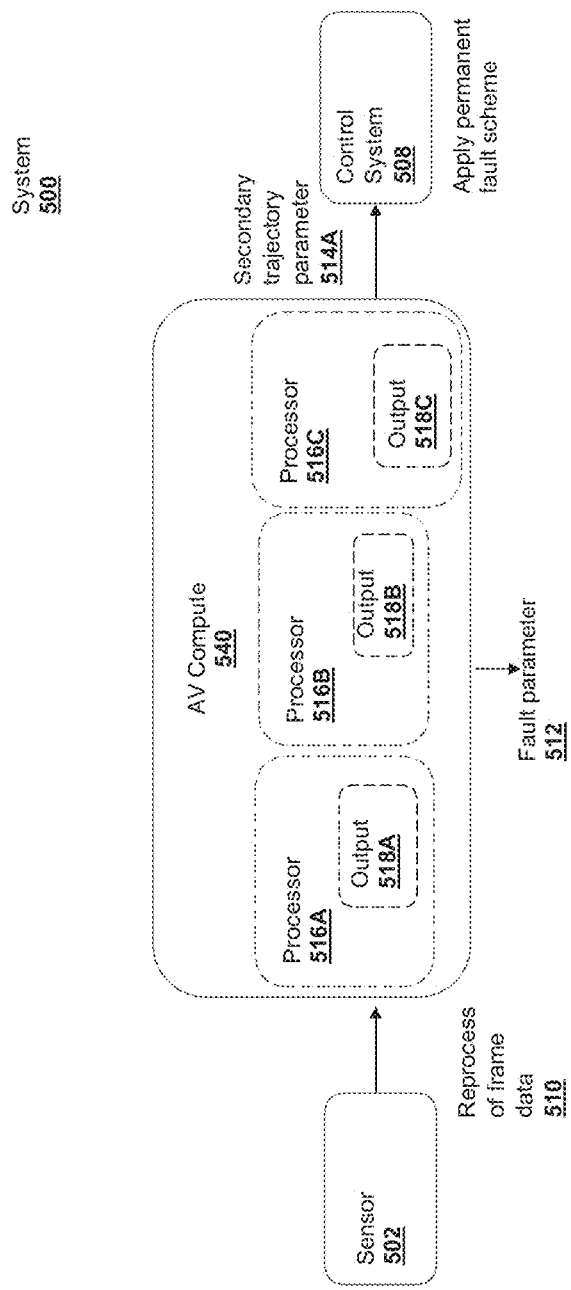

In one or more embodiments or examples, in response to determining that the fault parameter 512 indicative of a fault is present during the reprocessing, the system 500 is configured to apply a permanent fault scheme. In one or more embodiments or examples, in response to determining that the fault parameter 512 indicative of a fault is not present during the reprocessing, the system 500 is configured to not apply a permanent fault scheme. The application of the permanent fault scheme is shown in FIG. 5D. As the fault parameter 512 is indicative of the fault being present during the reprocessing, the fault is a permanent fault. In one or more embodiments or examples, the system 500, based on the permanent fault scheme, enters a safe state where the system 500 can deploy safety countermeasures, such as minimum risk maneuvers. For example, the system 500 does not operate the autonomous vehicle along the trajectory parameter 514 or secondary trajectory parameter 514A as they can have been affected by the permanent fault. Safety countermeasures, for example, include the system 500 providing operation data to cause operation of the autonomous vehicle to one or more of: not start, slow down, stop, and pull over.

Upon determination of a permanent fault, the system 500 may begin isolating the fault, such as the particular processor 516A, 5168, 516C causing the fault. In one or more embodiments or examples, applying the permanent fault scheme includes isolating a processor 516A, 5168, 516C of the at least one processor causing the fault parameter 512 to be indicative of a fault. The system 500 can be configured to isolate the problematic processor 516A, 516B, 516C, allowing for repair and/or replacement of the problematic processor 516A, 516B, 516C.

Figure 5E:
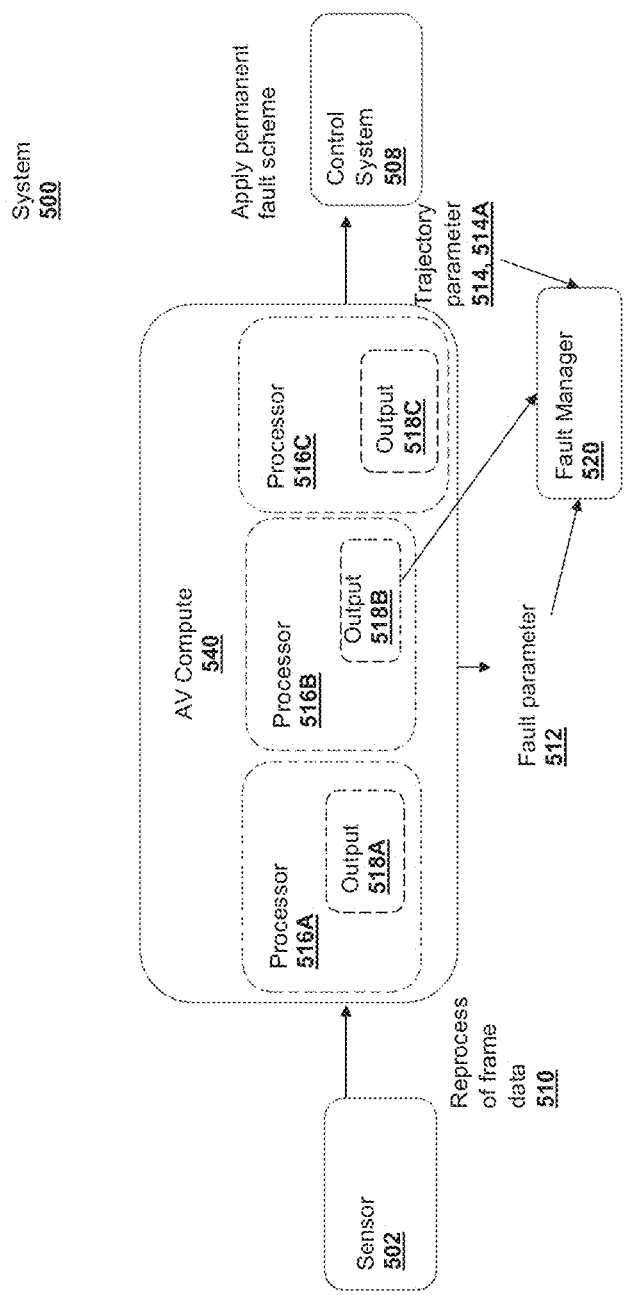

As an example, the system 500 provides one or more of the fault parameter 512, the trajectory parameter 514, the secondary trajectory parameter 514, or the output 518A, 518B, 518C of any of the processors 516A, 5168, 516C to a fault manager 520, such as shown in FIG. 5E. The fault manager 520 may attempt to determine the cause of the fault and/or the system that includes or caused the fault. In some cases, the fault manager 520 is a special purpose processor configured to perform the features of the fault manager 520. Alternatively, the fault manager 520 may be a processing node from among the processors 516 (or processor 716 or 718 described below, or the controller 750) or a general purpose processor that is designated to function as the fault manager 520. The fault manager 520 may, for example, compare outputs 518A, 518B, 518C and the fault parameter 512 with the prior execution results of the frame data 510. If the fault manager 520 determines that the outcome is identical after the comparison, the fault manager 520 can provide data indicative of a restart of the system 500, such as of the AV compute 540, while disabling any faulty processors 516A, 516B, 516C, as the fault has been isolated. If the fault manager 520 determines that the outcome is non-identical (e.g., inconsistent) after the comparison, the fault manager 520 can provide data indicative of delaying a restart of the system 500, such as of the AV compute 540, as the fault can be a dependent fault, meaning there could be a common and/or cascading cause to the fault.

In one or more embodiments or examples, the system 500 is configured to isolate the processor of the at least one processor causing the fault parameter to be indicative of a fault by determining the processor causing the fault parameter to be indicative of a fault. In one or more embodiments or examples, in response to the system 500 determining that the processor is causing the fault parameter to be indicative of the fault, the system 500 is configured to route data intended for the processor to another processor. In one or more embodiments or examples, in response to the system 500 determining that the processor is not causing the fault parameter to be indicative of the fault, the system 500 is configured to not route data intended for the processor to another processor.

For example, the system 500 may be configured to route data "around" the faulty processor. The system 500 can route incoming data to the faulty processor to another, or second, processor, which can allow the second processor to handle the data without faults. Embodiments of switching processes is described in more detail herein, particularly with respect to FIGS. 7A-7C. In some embodiments, the actinos or operations of the fault manager 520 or the processors 516 may depend on an amount of time to switch processors, to confirm a cause of the fault, or the safety of the trajectory, and the like. For example, if the autonomous vehicle can safely drive for a period of time (e.g., 100 ms, 500 ms, 2 second, etc) that is greater than an amount of time to determine a fault and route around the fault, then the autonomous vehicle may continue operating as if there were no fault while the fault manager 520 identifies the fault and takes measures to address the fault. IF on the other hand the amount of time to identify and respond to the fault is longer than a determined safe period of time, the fault manager 520 may cause the autonomous vehicle to adjust operation (e.g., by causing the vehicle to slow down and/or pull over).

In one or more embodiments or examples, the AV compute, such as AV compute 202F, AV compute 540, and/or AV compute 740, is an AV software or an AV hardware or a combination of an AV software and an AV hardware.

FIG. 6 illustrates a flowchart of a method or process 600 for robust fault tolerant architecture, such as for operating and/or controlling an AV. The method can be performed by a system disclosed herein, such as an AV compute system 400, AV compute system 540, or system 700 (described below) of a vehicle 102, 200. The system disclosed can include at least one processor which can be configured to carry out one or more of the operations of method 600. The method 600 can be performed (e.g., completely, partially, and/or the like) by another device or group of devices separate from or including the systems disclosed herein. In some embodiments, the method 600 may be performed by one or more processors (e.g., one or more processor 518) of the systems described herein.

In one or more embodiments or examples, the method 600 includes obtaining, at step 602, using at least one processor, frame data indicative of a frame of sensor data associated with an environment within which an autonomous vehicle is operating. In one or more embodiments or examples, the method 600 includes processing, at step 604, the frame data for determination of a trajectory parameter indicative of a trajectory of the autonomous vehicle. In some embodiments, the trajectory parameter may be used to determine the trajectory of the autonomous vehicle. The trajectory parameter may be one of a plurality of parameters used to determine the trajectory of the autonomous vehicle. In some such cases, the trajectory of the vehicle may not be determinable by the trajectory parameter alone, but may be determinable in combination with one or more additional parameters or trajectory parameters.

In one or more embodiments or examples, the method 600 includes determining, at step 606, during the processing, whether a fault parameter indicative of a fault is present. In one or more embodiments or examples, the method 600 includes, in response to determining that the fault parameter is indicative of a fault being present, applying, at step 608, based on the fault parameter, an initial fault scheme. In some cases, the initial fault scheme may include rerouting communication to exclude a processor, slowing the vehicle, causing the vehicle to stop, causing the vehicle to move to the side of the road and stop, or any other type of fault scheme to reduce or eliminate negative consequences associated with a fault. In some cases, the initial fault scheme may include taking no action for at least a period of time. For example, the initial fault scheme may include taking no action until the vehicle can safely stop, until a fault is confirmed, or because the fault is determined to be unrelated to safety of vehicle operation, and the like.

In one or more embodiments or examples, in response to determining that the fault parameter is not indicative of a fault being present, the method 600 includes not applying, at step 609, an initial fault scheme based on the fault parameter. In other words, if the fault parameter does not indicate a fault, the autonomous vehicle may continue operating according to normal specifications as defined or designed by a manufacturer. The autonomous vehicle may operate using the trajectory parameter determined at the step 604.

In one or more embodiments or examples, the method 600 includes, in response to determining that the fault parameter is indicative of a fault being present, reprocessing, at step 610, the frame data for determination of a secondary trajectory parameter indicative of a second trajectory of the autonomous vehicle. Alternatively, or in addition, step 610 may include processing prior frame data associated with determining a trajectory parameter not associated with a fault. For example, the prior frame data may be the most recent frame data not associated with a fault, other past frame data not associated with a fault, or stored reference data associated with fault-free operation.

In one or more embodiments or examples, the method 600 includes, at step 612, during or responsive to reprocessing of the frame data at step 610, determining whether the fault parameter is indicative of a fault being present. Determining whether the fault parameter is present may include comparing the trajectory parameter determined by reprocessing the frame data at step 610 with a prior determined trajectory parameter, a known trajectory parameter, an expected trajectory parameter, a reference trajectory parameter, or any other value that can be used to determine whether the value calculated at the step 610 indicates a fault.

In one or more embodiments or examples, applying, at step 608, the initial fault scheme includes suspending operation of the autonomous vehicle along the trajectory parameter. Alternatively, the autonomous vehicle may continue to operate for a period of time along the trajectory parameter. The period of time may be a particular period of time associated with confirming existence of the fault or whether the fault is a transient fault. In some cases, the period of time may be a quantity of time where the autonomous vehicle can be safely operated as further analysis of the fault or confirmation of whether the fault is transient is performed. In one or more embodiments or examples, applying, at step 608, the initial fault scheme includes storing output data of the at least one processor performing the processing at step 604, and reprocessing frame data at step 610.

In one or more embodiments or examples, in response to determining that the fault parameter indicative of a fault is not present during the reprocessing, the method includes providing, based on the trajectory parameter or the secondary trajectory parameter, operating data to cause operation of the autonomous vehicle based on the trajectory parameter or second trajectory parameter. In one or more embodiments or examples, in response to determining that the fault parameter indicative of a fault is present during the reprocessing, the method includes not providing, based on the trajectory parameter or the secondary trajectory parameter, operating data to cause operation of the autonomous vehicle. Alternatively, in response to indication of the fault, the operating data provided to control the autonomous vehicle may be associated with a fault processing scheme (e.g., may be operating data to cause the AV to slow down or pull over to the side of a road). In some cases, the operating data may be control data provided to the control system 508 that enables the control system 508 to control the autonomous vehicle.

In one or more embodiments or examples, providing the operating data to cause operation of the autonomous vehicle includes determining, using the at least one processor, based on the trajectory parameter, whether the secondary trajectory parameter satisfies a trajectory criterion. In one or more examples, providing the operating data to cause operation of the autonomous vehicle includes, in response to determining that the secondary trajectory parameter satisfies the trajectory criterion, providing, based on the secondary trajectory parameter, the operating data to cause operation of the autonomous vehicle. In one or more examples, providing the operating data to cause operation of the autonomous vehicle includes, in response to determining that the secondary trajectory parameter does not satisfy the trajectory criterion, not providing, based on the secondary trajectory parameter, the operating data to cause operation of the autonomous vehicle.

In some embodiments, the method 600 includes determining whether the secondary trajectory parameter satisfies the trajectory criterion of the secondary trajectory parameter for a certain number of pixels from the trajectory parameter. If it is determined that the secondary trajectory parameter satisfies the trajectory criterion (e.g., has greater than a particular number of pixel differences from the trajectory parameter), the method 600 includes providing operating data based on the secondary trajectory parameter, as the fault may have affected the trajectory parameter. However, if it is determined that the secondary trajectory parameter does not satisfy the trajectory criterion (e.g., has less than or equal to a particular number of pixel differences from the trajectory parameter), the method 600 may include providing operating data based on the trajectory parameter as both the trajectory parameter and secondary trajectory parameter can be viable due to the lack of interference by the fault. This determination can allow for some fault tolerance for the difference between the trajectory parameter and the secondary trajectory parameter, such as by allowing a particular number (e.g., 1, 2, 3, 4, 5, 6, 7, 8, 9, or 10, etc.) pixel differences between the secondary trajectory parameter and the trajectory parameter.

In one or more embodiments or examples, in response to determining that the fault parameter indicative of a fault is present during the reprocessing, the method includes applying, using the at least one processor, a permanent fault scheme. In one or more embodiments or examples, in response to determining that the fault parameter indicative of a fault is not present during the reprocessing, the method includes not applying, using the at least one processor, a permanent fault scheme.

In one or more embodiments or examples, applying the permanent fault scheme includes isolating a processor of the at least one processor causing the fault parameter to be indicative of a fault. Isolating the processor may include determining the processor causing the fault parameter to be indicative of a fault. Further, isolating the processor associated with the fault may include routing data intended for the processor to another processor. On the other hand, if it is determined that the isolated processor is not the cause of the fault, data intended for the processor may be provide to the processor rather than being rerouted to another processor.

The present disclosure relates to apparatuses, systems, methods, and computer program products that provide for efficient redundancy, and in particular, redundancy of safety critical autonomous vehicle applications. For example, the apparatuses, systems, methods, and computer program products provide for sensor outputs or at least critical sensor outputs being connected to the autonomous processors via a cross connector (e.g., a crossbar switch). The cross connector can communicatively couple processors in an adaptive manner. Further, the cross connector alone or in combination with a controller can control processors for provision of fault-reduced processing. For example, the systems, methods, and computer program products provide for determination of whether a primary or first processor is in a fault state and, in response to a determination that the primary or first processor is in a fault state, route, e.g., via a cross connector, a primary input, such as sensor data/sensor input or output from another processor, to a secondary processor, e.g., for the secondary processor to take over a primary task of the primary processor. In other words, a first primary task performed by a first primary processor, also denoted as first processor, can be offloaded, shifted, or transferred to the first secondary processor, also denoted as second processor, from the first primary processor. For example, a secondary processor (e.g., the second processor, such as the first secondary processor) can be configured to cover one or more faults for a random pair of primary processors (e.g., the first processor, the first primary processor, and/or the second primary processor). It can be appreciated that the present disclosure provides improved security of the AV and enables operating the AV even in case of faults occurring in critical parts of the AV and/or critical processing operation time of the AV. Further, a minimum risk maneuver, e.g., by a failover device, can be avoided resulting in continued operation of the AV. Further, the present disclosure can secure that safety-critical processing can be performed and prioritized even in case of faults occurring in processors performing the safety-critical processing. Further, a more robust and faster hardware architecture is provided.

In certain embodiments, one or more processors, such as one or more of the first processor, the second processor, and the third processor described herein, can be a system on a chip (SoC). In one or more embodiments or examples, the AV compute 740 can include one or more SoCs. Further, the AV compute 740 can be or can include the AV compute 540, or can implement one or more of the embodiments described with respect to the AV compute 540. In one or more embodiments or examples, the AV compute 740 can include SoCs arranged or separated in clusters such as main compute clusters, see e.g., FIG. 9. Each SoC can include one or more chiplets. Each SoC can include a plurality of chiplets. A processor, such as one or more of the first processor, the second processor, and the third processor, can be a chiplet. The chiplets can, individually or in combination, coordinate to perform one or more operations (e.g., perception planning via perception system 402, localization via localization system 406, control via control system 408, 708).

Figure 7A:
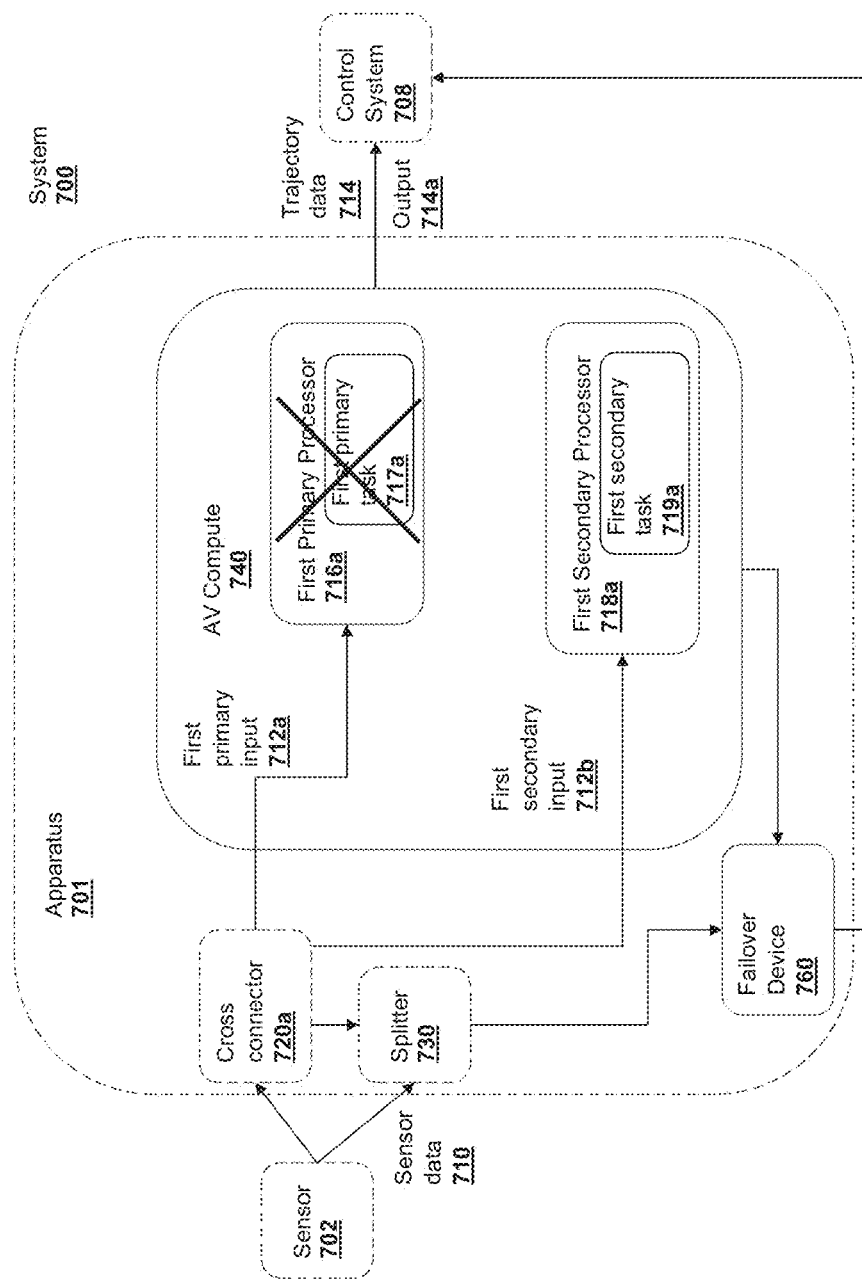
FIGS. 7A-7C are diagrams of an example implementation of a process for robust fault tolerant architecture.
Figure 7B:
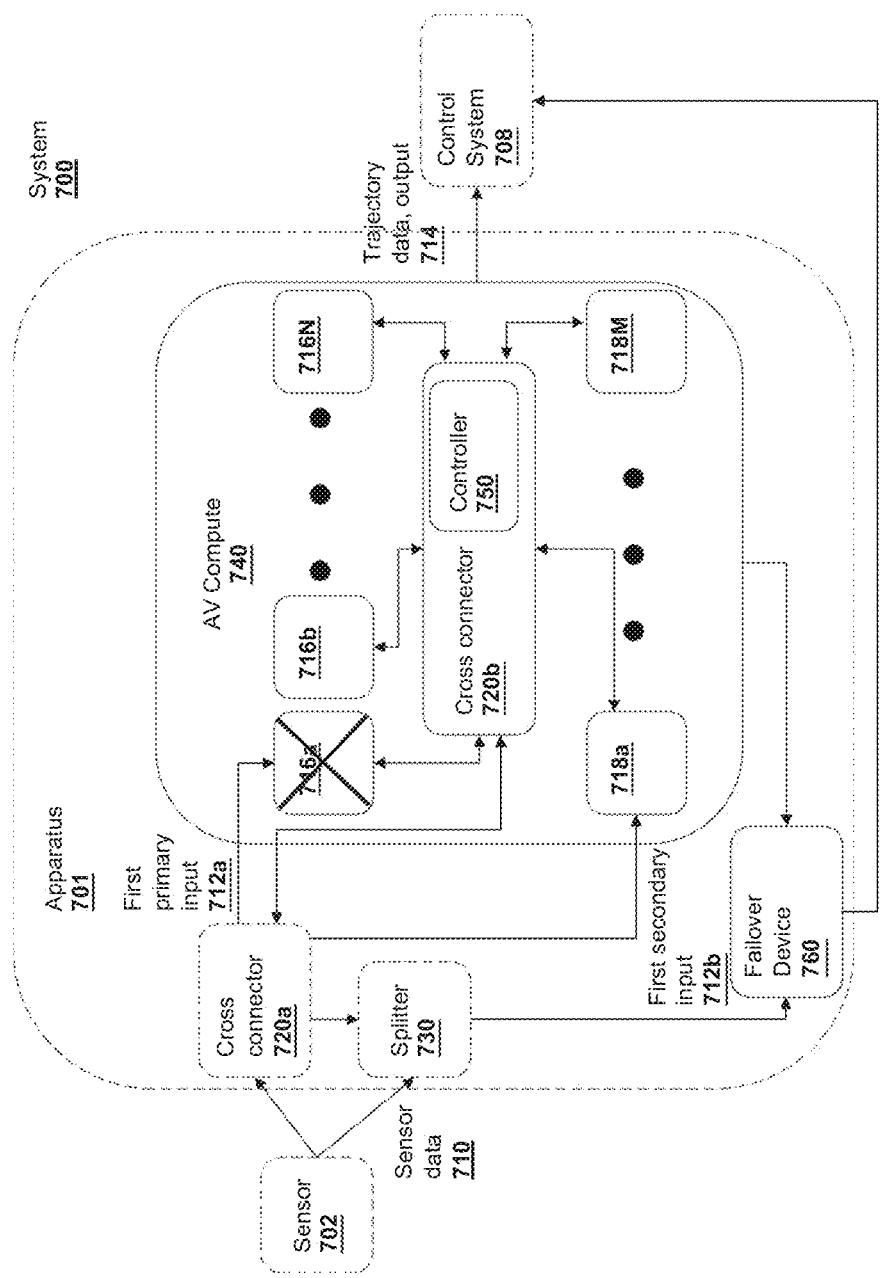
Figure 7C:
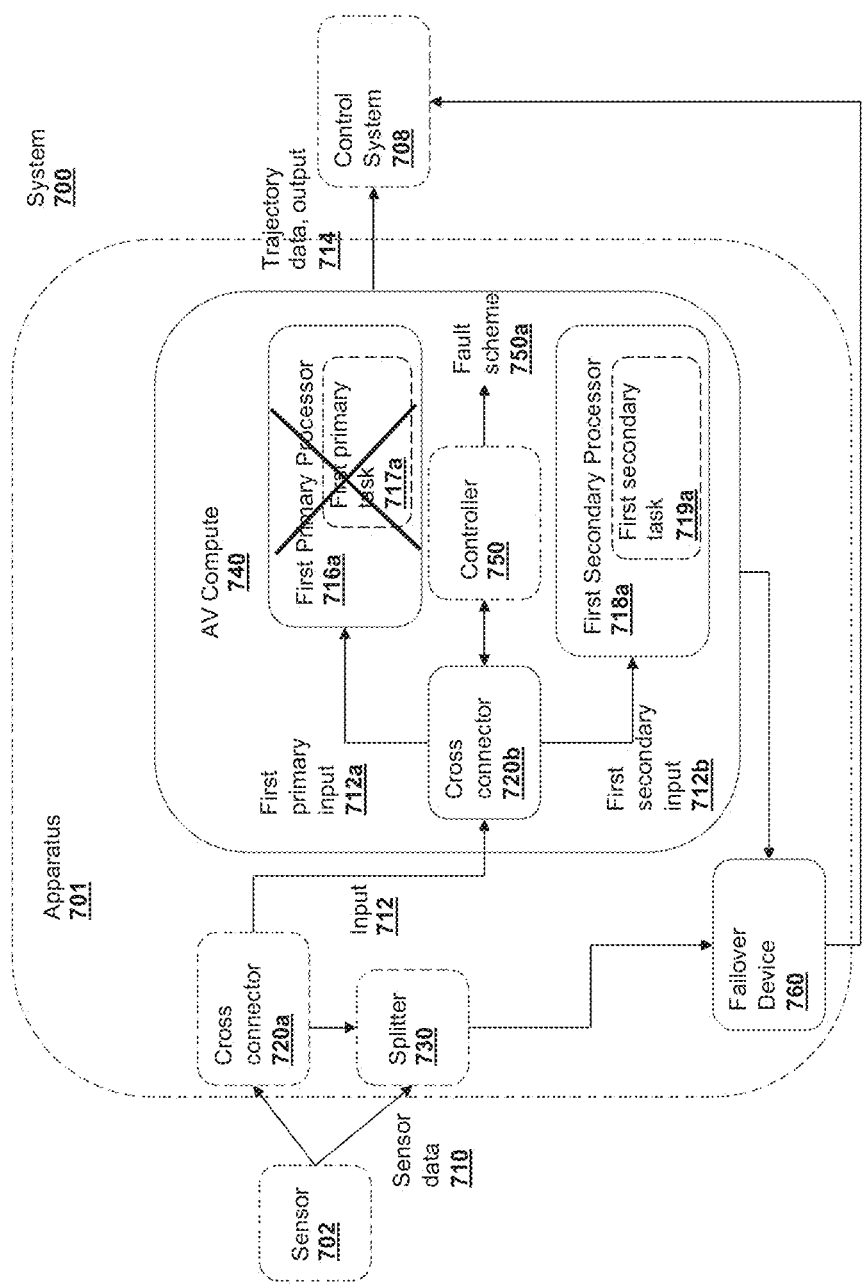

FIGS. 7A-7C illustrate a block diagram of an implementation of a system 700 that can implement a process for redundancy among processors, and in particular, for processors that implement safety critical autonomous vehicle applications. In one or more embodiments or examples, the system 700 includes an AV compute 740 which is the same as or like systems described above, such as an autonomous system (e.g., a system that is the same as or like autonomous system 202 of FIG. 2), an AV compute (e.g. an AV compute that is the same as or like AV compute 202*f* of FIG. 2), a remote AV system (e.g., a remote AV system that is the same as or like remote AV system 114 of FIG. 1), AV software 400 discussed with respect to FIG. 4, a fleet management system (e.g., a fleet management system that is the same as or like fleet management system 116 of FIG. 1), and/or an AV compute (e.g. an AV compute that is the same as or like AV compute 540 of FIGS. 5A-5E). For example, the system 700 and/or the AV compute 740 are part of an autonomous vehicle, such as autonomous vehicle 200 discussed with respect to FIG. 2. In one or more embodiments or examples, the AV compute 740 is part of the system 700. The AV compute 740 and/or the system 700, for example, includes one or more processors (such as processor 304 shown in FIG. 3). The AV compute 740 can be considered a processor.

For purposes of illustration, the following description of the system 700 for efficient redundancy will be with respect to an implementation of this process by autonomous vehicle compute 740 (which can be the same as, or similar to, autonomous vehicle compute 400 of FIG. 4). However, it will be understood that in some examples the system 700 (e.g., one or more elements of the system 700) is implemented by other systems different from, or in addition to autonomous vehicle compute 740 such as an AV (e.g. illustrated in FIG. 2), an autonomous system (e.g., a system that is the same as, or similar to, autonomous system 202 of FIG. 2), a remote AV system (e.g., a remote AV system that is the same as, or similar to, remote AV system 114 of FIG. 1), and/or a fleet management system (e.g., a fleet management system that is the same as, or similar to, fleet management system 116 of FIG. 1).

The AV compute 740 can be utilized for efficient and robust redundancy in any and/or all systems of the autonomous vehicle compute 400 shown in FIG. 4, such as the perception system 402, the planning system 404, the localization system 406, the control system 408, and the database 410.

Disclosed herein is a system 700. The system 700 includes at least one processor. The at least one processor can be, for example, AV compute 740, AV compute 400, AV compute 540, or another processor in the system 700. The AV compute 740 can be seen as a processing device. The system 700 includes an apparatus 701 that can include a plurality of processors which may include a first primary processor 716a (e.g., first processor) optionally configured to perform a first primary task 717a (e.g., a first task) and a first secondary processor 718a (e.g., second processor) optionally configured to perform a first secondary task 719a (e.g., a second task). The apparatus 701 can further include a third processor. The third processor can be any one or more of the plurality of processors of the apparatus 701, e.g., any one or more of the plurality of processors not being in a fault state. The first primary processor 716a as disclosed herein is also denoted as the first processor, and the wording first primary processor and first processor can be used interchangeably. The first secondary processor 718a as disclosed herein is also denoted as the second processor, and the wording first secondary processor and second processor can be used interchangeably. In other words, the apparatus 701 includes a plurality of processors, such as the AV compute 740, and can include a first primary processor 716a (first processor) and a first secondary processor 718a (second processor). The first primary processor 716a can be configured to perform a first primary task 717a and the first secondary processor 718a can be configured to perform a first secondary task 719a. The plurality of processors including the first processor and the second processor can be configured to perform functions associated with a neural processor network, a GPU, a CPU, and/or the like. The plurality of processors including the first processor and the second processor can be configured to perform some or all functions as described with regard to FIG. 4 and/or perception/processing pipeline. In some examples or embodiments, each or some of the processors 716a, 716b, ..., 716N and 718a, ..., 718M are the same as or similar to an SoC (e.g., an MPSoC). In some examples or embodiments, each or some of the processors 716a, 716b, ..., 716N and 718a, ..., 718M are the same as or similar to a core of an SoC (e.g., an MPSoC). In some examples or embodiments, each or some of the processors 716a, 716b, ..., 716N are implemented in a primary or first cluster, and each or some of the processors 718a, ..., 718M are implemented in a secondary or second cluster separate from the primary cluster, e.g. the same as or similar to main compute clusters. In certain embodiments M is less than N. In other words, there may be less secondary processors 718M than primary processors 716N. In other embodiments, the number of secondary processors 718M may be equal to the number of primary processors 716N. The processors 716a, 716b, ..., 716N may individually or collectively be referred to as the processor 716 or processors 716. In some embodiments, the processors 716 can be one or more of the processors 516 described in more detail above and/or can include one or more of the embodiments described with respect to the processors 516. The processors 718a, 718b, ..., 718M may individually or collectively be referred to as the processor 718 or processors 718. In some embodiments, the processors 718 can be one or more of the processors 516 described in more detail above and/or can include one or more of the embodiments described with respect to the processors 516.

The number of processors M of the processors 718 may correspond to the number of processors 716 for which the processors 718 may serve as backup processors. For example, if there are five processors 718, then it may be possible to replace up to five faulty processors 716 with processors 718. If M matches N, then it may be possible to replace all of the processors N. However, in certain embodiments, M is less than N and thus, only a subset of processors N may be replaced in response to detection of a fault. Each of the processors 716 and 718 may be associated with or have its own memory (e.g., cache). Alternatively, or in addition, at least some of the processors 716 and 718 may be associated with a shared memory (e.g., RAM or non-volatile memory). In some embodiments, at least some of the processors 716 and/or 718 may communicate through shared memory. Further, in some cases, at least some of the processors 716 and 718 may be dynamically configurable. For example, a processor 716 or 718 may be dynamically configured to perform different tasks or to communicate with different processors of the plurality of processors 716 and 718.

In one or more embodiments or examples, the system 700, such as the apparatus 701, includes a plurality of primary processors for example comprising the first primary processor 716a, a second primary processor 716b, and up to N-number of primary processors 716N, see for example in FIG. 7B. The primary processors, such as the first primary processor 716a and/or the second primary processor 716b, can be processors configured to perform a primary task. In other words, each primary processor can be configured to perform one or more tasks, such as one or more primary tasks. In one or more embodiments or examples, a primary task, such as the first primary task 717a, is a critical task. In other words, a primary task, such as a critical task, can be a task critical for the operation of an autonomous vehicle or a task without which the autonomous vehicle would not be able to operate or operate within safety parameters. A critical task can vary depending on the environment and/or the state of the autonomous vehicle. In other words, a task can be a critical task in a certain environment and/or state of the autonomous vehicle, but may not be a critical task in another environment and/or state of the autonomous vehicle. A critical task can be a dynamic driving task. A task can be associated with one or more sensors that generate sensor data, such as sensor data 710. A critical task can be associated with one or more critical sensors, such as critical sensor data and/or critical traffic.

In one or more embodiments or examples, the apparatus 701 includes a plurality of secondary processors that may include the first secondary processor 718a, a second secondary processor 718b (not explicitly shown in FIG. 7B), and up to M-number of secondary processors 718M, see for example in FIG. 7B. The secondary processors, such as the first secondary processor 718a, can be processors configured to perform a secondary task. In other words, each secondary processor can be configured to perform one or more tasks, such as one or more secondary tasks. In one or more embodiments or examples, a secondary task may be less critical than a primary task. In other words, a criticality level of the first secondary task 719a can be lower than a criticality level of the first primary task 717a. A primary or critical task may be a task that is associated with movement or safe operation of the autonomous vehicle. For example, critical tasks may be associated with speed, acceleration, or trajectory control, pedestrian detection, obstacle detection, and the like. A secondary or non-critical task may be a task associated with features of the autonomous vehicle that are not associated with movement or safe operation of the autonomous vehicle. For example, secondary or non-critical tasks may be associated with seatbelt state detection, cellular communication, display screen operation, door lock state, climate control, and the like. In some cases, what qualifies as a primary task or a secondary task may be subjective or may vary based on vehicle manufacturer. For example, seatbelt state detection may be considered a primary task as the safety of a passenger may be directly impacted by the seatbelt state in an accident. In some embodiments, the designation of primary and secondary processors may be reversed. In other words, in some cases, the processors 718 may be configured to perform primary (or critical) tasks and the processors 716 may be configured to perform secondary tasks.

In one or more embodiments or examples, the apparatus 701 can be configured to assign a criticality and/or an importance parameter and/or level to a task. For example, by assigning a criticality and/or an importance parameter to a task, the apparatus 701 can be configured to determine whether a task is a primary task or a secondary task. In one or more embodiments or examples, the apparatus 701 can be configured to assign a primary task to a primary processor and/or a secondary task to a secondary processor. For example, the apparatus 701 can be configured to assign the first primary task 717a to the first primary processor 716a, and/or the first secondary task 719a to the first secondary processor 718a. In some embodiments, the processors 716 and 718 can be special purpose processors or integrated circuits configured to perform any primary or secondary task of the AV compute 740. For example, each of the processors 716 and 718 can be configured to implement one or more nodes within a neural network or other machine learning structure. Alternatively, the processors 716 and 718 can be general purpose CPUs or GPUs, which may each be configured to implement one or more nodes within a neural network or other machine learning structure, or any other task of the AV compute 740. Regardless of the structure or implementation of the processors 716 and 718, and although the processors 718 may typically perform less critical tasks, the processors 718 may be configured to implement or perform at least the same functions as the processors 716 enabling the processor 718 to function as backup processors for at least some of the processors 716.

The apparatus 701 includes a cross connector, such as cross connector 720a and/or cross connector 720b, communicatively couplable to one or more sensors (e.g., to a plurality of sensors), such as sensor 702, and communicatively coupled to the first primary processor 716a (first processor) and the first secondary processor 718a (the second processor). In other words, in an operation state of the AV, the cross connector, such as cross connector 720a and/or cross connector 720b, is communicatively coupled to one or more sensors (e.g., to a plurality of sensors), such as sensor 702, and communicatively coupled to the first primary processor 716a (first processor) and the first secondary processor 718a (the second processor). The cross connectors 720a and 720b may individually or collectively be referred to as cross connector 720 or cross connectors 720. In some embodiments, the cross connector 720a and the cross connector 720b may be replaced by a single cross connector. In some other embodiments, the cross connectors 720a and 720b may be split into more cross connectors. In some embodiments, some or all of the cross connectors may be logically or physically connected and/or configured to communicate with each other. The cross connectors 720 may be physical crossbars that physically connect one or more sensors 702 to one or more processors 716 or 718, or that physically connect one or more processors 716 to each other and/or to one or more processors 718 and vice versa. Additionally, or alternatively, the cross connectors 720 may include logical connections that virtually connect one or more sensors or processors via, for example, a communication bus and/or a memory.

In some embodiments, at least some of the processors 716 or 718 may implement a layer within a neural network. The cross connectors 720 may connect nodes within the layer and/or connection nodes between layers of the neural network.

The sensor 702 can include one or more sensors, such as one or more critical sensors configured to measure phenomena or other input from an environment associated with critical tasks. In one or more embodiments or examples, a LIDAR sensor, a camera, and/or a radar can be a critical sensor. The sensor 702 can be configured to provide and/or transmit sensor data 710. It can be appreciated that the cross connector, such as cross connector 720a and/or cross connector 720b, can be configured to obtain, retrieve, and/or receive sensor data, such as sensor data 710, from one or more sensors, such as sensor 702. The sensor data can be associated with an environment, such as an environment of the AV. The sensor data can be one or more of: radar sensor data, non-radar sensor data, camera sensor data, image sensor data, audio sensor data, and LIDAR sensor data. The sensor data is associated with an environment an autonomous vehicle is operating in. For example, the sensor data is indicative of an object, and/or a plurality of objects, in the environment around an autonomous vehicle.

Further, the sensor 702 may include one or more non-critical sensors configured to measure input from an environment not associated with a critical task. For example, the sensor 702 may measure the state of a radio, a door, a seatbelt, a display screen, and the like. In some cases, separate cross connectors 720 may communicate non-critical sensor data and critical sensor data to the processors 716, 718. In other cases, one cross connector 720 may communicate both critical and non-critical sensor data to the processors 716, 718. In some embodiments, critical and non-critical sensors may be case-specific. For example, at slower speeds (e.g., such as when picking up children from school), the camera sensor may be a critical sensor as it can indicate the closeness of pedestrians or other obstacles. In such cases, long-range LiDAR sensors may be less critical. The opposite may be true when the vehicle is operating a highway speeds.

The sensor 702 can be one or more sensors, such as a first onboard sensor. In one or more embodiments or examples, the sensor 702 is associated with the autonomous vehicle. The sensor 702 can be one or more of: a radar sensor, a non-radar sensor, a camera sensor, a microphone, an infrared sensor, an image sensor, and a LIDAR sensor. In one or more embodiments or examples, the sensor 702 is one or more of the sensors illustrated in FIG. 2.

In FIG. 7A, the apparatus 701 includes a cross connector 720a arranged outside the AV compute 740. The cross connector 720a can be communicatively couplable to one or more sensors, such as sensor 702, and communicatively coupled to the first primary processor 716a and the first secondary processor 718a. The cross connector 720a and the cross connector 720b can be communicatively coupled, see FIGS. 7B and 7C.

The first processor/first primary processor 716a receives or is configured to receive a sensor input from at least one sensor of the plurality of sensors, such as sensor 702. In other words, the first processor/first primary processor 716a may be configured to receive, obtain, and/or retrieve a sensor input from at least one sensor of the plurality of sensors, such as from sensor 702. The sensor input as disclosed herein can be seen as the first primary input 712a, the first secondary input 712b, and/or input 712. The sensor input can be an output from one or more sensors to be input to one or more processors. The first primary processor 716a is configured to obtain a first primary input 712a associated with first sensor data of a first sensor of the one or more sensors and associated with an environment, such as an environment of an autonomous vehicle. In other words, the first primary input can be associated with or based on an environment that an AV is operating in. In one or more embodiments or examples, the first primary processor 716a is configured to obtain a first primary input 712a associated with first sensor data of a first sensor of the one or more sensors and associated with an environment of an autonomous vehicle according to an assigned state of the vehicle and/or environment, such as based on an environment that an AV is operating in.

The first sensor can be part of the sensor 702. In one or more embodiments or examples, the first primary processor 716a can be configured to obtain first sensor data from the first sensor, e.g., via the cross connector 720a. The first sensor can be seen as a critical sensor and the first sensor data can be seen as critical sensor data.

The first primary processor 716a can be configured to obtain the first primary input 712a from the cross connector 720a. The second processor/first secondary processor 718a can be configured to obtain a first secondary input 712b from the cross connector 720a. In FIG. 7B, the apparatus 701 includes a cross connector 720b being inside the AV compute 740. In other words, the AV compute includes the cross connector 720b. The cross connector 720b can be communicatively couplable to one or more sensors, such as sensor 702, and communicatively coupled to the first primary processor 716a and the first secondary processor 718a. In one or more embodiments or examples, the cross connector 720b is communicatively coupled to the second primary processor 716b. The cross connector 720b can be communicatively coupled to the plurality of primary processors up to primary processor 716N, such as from 716a, 716b, . . . , to 716N, and communicatively coupled to the plurality of secondary processor up to secondary processor 718a, . . . , to 718M. In one or more embodiments or examples, the apparatus 701 includes a cross connector 720a being outside the AV compute 740. The cross connector 720a can be communicatively couplable to one or more sensors, such as sensor 702, and communicatively coupled to the first primary processor 716a and the first secondary processor 718a. The first primary processor 716a can be configured to obtain the first primary input 712a from the cross connector 720a. The first secondary processor 718a can be configured to obtain the first secondary input 712b from the cross connector 720a. In one or more embodiments or examples, the cross connector 720a can be communicatively coupled to the plurality of primary processors up to primary processor 716N and communicatively coupled to the plurality of secondary processors up to secondary processor 718M. A cross connector, such as cross connector 720a and/or cross connector 720b, can include one or more crossbar switches implemented by a semiconductor. A cross connector, such as cross connector 720a and/or cross connector 720b, can be seen as a hitless switch. The cross connector 720a can be configured to communicatively couple one or more sensors, such as sensor 702, with one or more processors, such as one or more primary processors and/or one or more secondary processors. The cross connector 720b can be configured to communicatively couple one or more primary processors, such as the first primary processor 716a, with one or more secondary processors, such as the first secondary processor 718a.

In FIG. 7C, the apparatus 701 includes a cross connector 720b inside the AV compute 740. In other words, the AV compute 740 includes the cross connector 720b. The cross connector 720b can be communicatively couplable to one or more sensors, such as sensor 702, and communicatively coupled to the first primary processor 716a and the first secondary processor 718a. In one or more embodiments or examples, the cross connector 720b is communicatively coupled to the second primary processor 716b. Optionally, the apparatus 701 of FIG. 7C also includes a cross connector 720a. The cross connector 720a can be configured to provide an input 712 to the cross connector 720b. The cross connector 720b can then be configured to provide, based on the input 712, the first primary input 712a and/or the first secondary input 712b.

The third processor, for example implemented as controller 750, determines or is configured to determine that the first processor is in a fault state. In some embodiments or examples, the system 700, such as the apparatus 701, may be configured to determine, using one or more processors of the plurality of processors, whether the first primary processor 716a (e.g., first processor) is in a fault state. In other words, the apparatus 701 may be configured to determine whether a fault criterion is met. In response to a determination that the first processor is in a fault state, the third processor, such as controller 750, routes the sensor input (and/or causes the cross connector 720a and/or 720b to route the sensor input) (e.g., first primary input 712a) to the second processor/first secondary processor 718a. In other words, the third processor performs a switchover of the sensor input (e.g., first primary input 712a) to the second processor/first secondary processor 718a. In some embodiments, some or all of the processors 716 or 718 may include an ability to detect whether it is faulty or is starting to fail. Alternatively, or in addition, the controller 750 monitors the processors 716 or 718 to detect processor faults or failures. When a processor fault is directed, the controller 750 may adjust a processor communication topology or processor communication to, for example, remove the faulty processor from a communication or processing chain or network. Further, the adjustment of the processor communication topology may include replacing the faulty processor with another available processor (e.g., a secondary processor). In some embodiments, the controller 750 may adjust processor communication topology to alleviate load on the processors instead of or in addition to substituting a faulty processor with another processor in the communication topology.

In FIGS. 7A-7C, the first processor/first primary processor 716a may be in a fault state as illustrated by the first primary processor being crossed out. It can be appreciated that in response to a determination that any one of the primary processors, e.g., any of the primary processors 716a, 716b, . . . , 716N, are in a fault state, the apparatus 701 can be configured to route any input to any of the primary processors, e.g. the faulty processor, as any input to any of the secondary processors e.g., any of the secondary processors 718a, . . . , to 718M. In other words, in response to a determination that any one of the primary processors, e.g., any of the primary processors 716a, 716b, . . . , 716N, are in a fault state, any of the secondary processors, e.g., any of the secondary processors 718a, . . . , to 718M, can take over (such as perform) the task(s) of the primary processor(s) being in a fault state. It can be appreciated that any pair of primary processors and secondary processors can be configured to be redundant for each other (such as replace each other), such as any of the secondary processors being redundant for any of the primary processors (such as any secondary processor can replace any primary processor). For example, the apparatus 701 can be configured to route any primary input intended to any primary processor as a secondary input to any secondary processor. For example, the apparatus 701 can be configured to route a first primary input 712a as a fourth secondary input 712d to a fourth secondary processor 718d. In one or more embodiments or examples, the apparatus 701/third processor/controller 750 routes or is configured to route, in response to a determination that the first primary processor 716a is in the fault state, via the cross connector (such as via cross connector 720a and/or cross connector 720b), the first primary input 712a as a first secondary input 712b to the first secondary processor 718a. In other words, in response to a determination that the first primary processor 716a is in the fault state, the apparatus 701 routes the first primary input 712a as a first secondary input 712b to the first secondary processor 718a.

In response to a determination that the first processor is not in a fault state, the third processor refrains from routing the sensor input (e.g., first primary input 712a/critical sensor data) to the second processor/first secondary processor 718a. In one or more embodiments or examples, the apparatus 701 is configured to, in response to a determination that the first primary processor 716a is not in the fault state, refrain from routing, via the cross connector (such as via cross connector 720a and/or cross connector 720b), the first primary input 712a as a first secondary input 712b to the first secondary processor 718a. In other words, in response to a determination that the first primary processor 716a is not in the fault state, the apparatus 701 refrains from routing the first primary input 712a as a first secondary input 712b to the first secondary processor 718a.

In one or more embodiments or examples, the first processor/first primary processor 716a and/or primary processors 716a-716N is/are associated with a first data processing pipeline. In one or more embodiments or examples, the second processor/first secondary processor 718a and/or secondary processors 718a-718M is/are associated with a second data processing pipeline. A data processing pipeline can include a pipeline of tasks, such as a series of tasks, performed by one or more processors. For example, the first data processing pipeline includes a plurality of tasks, such as a plurality of primary tasks (e.g., tasks implemented by a perception system, localization system, planning system, and/or control system, described with respect to FIG. 4), performed by the primary processors such as performed by one or more of the primary processors from 716a, 716b, . . . , 716N. For example, the second data processing pipeline includes a plurality of tasks, such as a plurality of secondary tasks, performed by the secondary processors such as performed by one or more of the secondary processors from 718a, . . . , to 718M. The first data processing pipeline can be configured to perform operation critical operations, e.g., mission essential safety critical systems. The second data processing pipeline can be configured to perform operations having a criticality level which is lower than a criticality level of the operations to be performed by the first data processing pipeline.

In one or more embodiments or examples, the apparatus 701 includes a controller, such as controller 750 of FIGS. 7B and 7C, configured to assign and/or configure the first secondary processor 718a to perform the first primary task 717a as the first secondary task 719a. In one or more embodiments or examples, the controller 750 can be incorporated into the cross connector and/or third processor, such as the controller 750 can be incorporated into the cross connector 720a and/or the cross connector 720b. The cross connector can therefore be configured to perform the operations of the controller. In other words, the third processor/controller 750 is configured to change a designation (such as redesignation) of the first primary task 717a to the first secondary task 719a. It can be appreciated that the third processor/controller 750 is configured to assign the redesignated task, such as the first primary task 717a, to the first secondary processor 719a, e.g., as a first secondary task 719a.

In one or more embodiments or examples, the controller, such as controller 750, is configured to determine a fault scheme, such as fault scheme 750a, indicative of fault states of the one or more processors. In other words, the controller, such as controller 750, is configured to determine a fault scheme, such as fault scheme 750a, indicative of fault states of the one or more primary processors and/or secondary processors.

In one or more embodiments or examples, the third processor and/or the controller, such as controller 750, is configured to determine, based on the fault scheme 750a, a task scheme indicative of tasks to be performed by one or more processors of the plurality of processors. In other words, the third processor and/or controller, such as controller 750, is configured to determine a task scheme indicative of tasks (such as comprising the first primary task 717a and/or the first secondary task 719a) to be performed by one or more primary processors and/or secondary processors, such as to be performed by the first primary processor 716a and/or the first secondary processor 718a.

In one or more embodiments or examples, the third processor and/or controller, such as controller 750, is configured to control, based on the task scheme, the cross connector, such as cross connector 720a and/or cross connector 720b, to route sensor data, such as sensor data 710, and/or to route one or more outputs of the one or more processors as one or more inputs to the one or more processors. For example, the controller, such as controller 750, can be configured to control, based on the task scheme, the cross connector, such as cross connector 720a and/or cross connector 720b, to route a first primary output from the first primary processor 716a as the first secondary input 712b to the first secondary processor 718a. In one or more embodiments or examples, the controlling of the cross connector based on the task scheme can also be based on the first data processing pipeline and/or the second data processing pipeline.

In one or more embodiments or examples, the third processor and/or controller, such as controller 750, configures, based on the task scheme, the one or more processors, such as primary processors and/or secondary processors, to perform a respective task indicated by the task scheme. In other words, the third processor and/or controller, such as controller 750, can be configured to assign, based on the task scheme, the one or more processors, such as primary processors and/or secondary processors, to perform a respective task indicated by the task scheme. For example, the third processor and/or controller, such as controller 750, is configured to provide, based on the task scheme, the one or more processors, such as primary processors and/or secondary processors, one or more task identifiers to the plurality of processors, where each task identifier is indicative of a respective task to be performed by each processor of the plurality of processors.

In one or more embodiments or examples, the cross connector, such as cross connector 720a and/or cross connector 720b, is configured to obtain the first sensor data, such as sensor data 710. In one or more embodiments or examples, the third processor and/or the cross connector, such as cross connector 720a and/or cross connector 720b, is configured to route the first sensor data, such as a first primary input 712a, to the first primary processor 716a. In one or more embodiments or examples, the apparatus 701, such as third processor, is configured to, in accordance with the determination that the first primary processor 716a is in a fault state, route, via the cross connector, such as cross connector 720a and/or cross connector 720b, the first sensor data to the first secondary processor 718a.

In one or more embodiments or examples, the system 700, such as the apparatus 701, includes a splitter 730 and a failover device 760. The splitter 730 may be configured to split sensor data, such as sensor data 710, for provision of the sensor data to the failover device 760. The failover device 760 can be a safety controller. The failover device 760 can be a device capable of performing one or more critical operations and/or critical operation tasks of the AV. For example, when the AV compute 740 is in a fault state, e.g., one or more primary processors and/or one or more secondary processors are in a fault state making the AV compute 740 unable to perform one or more operations and/or tasks, the failover device 760 can take over one or more operations and/or tasks of the AV compute 740. In one or more embodiments or examples, the failover device 760 can be implemented in one or more processors, such as one or more SoC's e.g. implemented in a failover cluster separate from main compute clusters, see e.g., FIG. 9. The failover device 760 can be communicatively coupled to the AV compute 740, e.g., in order to obtain and/or receive information regarding the fault state of the AV compute, such as at which one or more tasks the AV compute 740 failed and/or stopped operating.

The failover device 760 can be configured to perform or execute a fault processing scheme or fault processing operation that includes the minimum requirement operations of the AV or the minimum safety operations, such as pull-over to the side when the AV compute is in a fault state. In other words, the failover device 760 can be configured to perform and/or determine a minimum risk maneuver or operations that can safely end operations in a location that is safe to passengers. For example, it may be unsafe to immediately cease movement on a highway. Thus, the failover device 760 may be configured to safely cause the autonomous vehicle to move to a safe location (e.g., side of road, parking lot, etc.) before shutting down or ceasing movement. The failover device 760 may implement the fault processing scheme by outputting instructions, commands, and/or trajectory data to the control system 708 that causes the autonomous vehicle to safely cease operation. Safely ceasing operation may include causing the autonomous vehicle to identify a safe location (e.g., a side of the road, a parking lot, etc.) to cease operation and may cause the autonomous vehicle to proceed to the safe location and then cease operation. Ceasing operating may include completely deactivating the autonomous vehicle, or may include ceasing movement of the autonomous vehicle while permitting other operations.

In one or more embodiments or examples, the system 700, such as the apparatus 701, can be configured to activate the splitter 730 when the AV compute 740 is in a fault state. The AV compute 740 may be determined to be in a fault state when a processor 716 is in a fault state or is associated with a fault, when a threshold number of processors 716 is in a fault state, or when a threshold number of processors 716 and processors 718 are in a fault state. In some cases, the threshold number of processors 716 and/or processors 718 required to be in a fault state to cause the AV compute 740 to be in a fault state may depend on the number of processors 716 and/or processor 718. In some cases, the threshold number or processors that cause the AV compute to be in a fault state may be equal to the number of processor 718. In other cases, the threshold number of processors that trigger the AV compute 740 to be in a fault state may be less than the number of processors 718 because, for example, a minimum number of processors may be designated or required to perform secondary tasks. In one or more embodiments or examples, the system 700, such as the apparatus 701, is configured to selectively transmit, e.g., via the splitter, sensor data 710 to the failover device 760.

In one or more embodiments or examples, the first processor/first primary processor 716a and the second processor/second primary processor 718a are implemented in a single integrated circuit or separate integrated circuits. In one or more embodiments or examples, the first processor/first primary processor 716a, the second processor/second primary processor 718a, and/or the third processor are implemented in a single integrated circuit, a plurality of integrated circuits, or as individual integrated circuits. In one or more embodiments or examples, the AV compute is partitioned in two logical groups, e.g., the primary processors including the first processor and the secondary processors including the second processor. In other words, the AV compute can be partitioned in two logical groups, e.g., the primary processors configured to operate according to the first data processing pipeline and the secondary processors configured to operate according to the second data processing pipeline.

In one or more embodiments or examples, the apparatus 701 is configured to determine trajectory data 714 indicative of one or more trajectories for an autonomous vehicle (such as the AV as disclosed herein) and provide an output 714a based on the trajectory data 714. In some cases, the trajectory data 714 may be one or more trajectory parameters used by the control system 708 to determine a trajectory of the autonomous vehicle. In one or more embodiments or examples, the apparatus 701 is configured to transmit and/or provide the trajectory data 714 and/or the output 714a to a control system 708 of the system 700. In some embodiments, the control system 708 may include one or more of the embodiments described with respect to the control systems 408, 508, and/or 608.

In one or more embodiments or examples, the failover device 760 is configured to determine trajectory data indicative of one or more trajectories for an autonomous vehicle (such as the AV as disclosed herein) and provide an output based on the trajectory data. In one or more embodiments or examples, the failover device 760 is configured to transmit and/or provide the trajectory data and/or the output to a control system 708 of the system 700.

FIG. 8 illustrates a flowchart of a method or process 800 for robust fault tolerant architecture that enables substituting a primary processor with a secondary processor upon identification of a fault associated with execution of the primary processor. The method 800 can be implemented by any system that includes a plurality of processors and that can substitute one processor for another in a processor execution chain. For example, the method 800 can be performed by the AV compute system 740 (or any of the other AV compute systems described herein), a controller 750, a fault manager 520, or any other system that can respond to a fault in a processor 516, 716, 718 by at least substituting one processor for another within the processor execution chain. In some cases, at least one of the processors 516, 716, 718 may be configured to perform the method 800. The processor execution chain can include an ordering of processors that may be used to implement one or more operations during, for example, execution of an autonomous vehicle.

In certain embodiments, the method 800 includes obtaining a first primary input 712a at step 802. The first primary input 712a may be received from a sensor 702 via, for example, the cross connector 720. The first primary input 712a may include any type of sensor data (e.g., image sensor data or LiDAR sensor data) that may be used to perform a primary task. The primary task may include any type of task that is used to control movement (e.g., trajectory, acceleration, speed, stoppage, etc.) of the autonomous vehicle. In some cases, the primary task may include any task associated with safe operation of the autonomous vehicle. The primary tasks may be executed by one or more primary processors 716. In contrast, a secondary task may be performed by one or more secondary processor 718. The secondary task may include any type of task that is not associated with safe operation of the autonomous vehicle, or not directly associated with safe operation of the autonomous task. For example, the secondary task may be associated with a door state, a state of lights, an infotainment screen state, rear passenger occupancy state, and the like.

At step 804, the method includes providing the first primary input to a first primary processor 716. It should be understood that the primary and secondary processors may be configured similarly or the same, but that certain processors 716, 718 may be designated primary processors responsible for primary tasks and other processors 716, 718 may be designated secondary processors responsible for secondary tasks. The primary processor may be a first primary processor in a set of processors responsible for executing a task. Alternatively, the primary processor may be any other processor within a primary processor chain or of a set of processors responsible for executing the task. In some such cases, the step 804 may include providing an output of the previous primary processor (e.g., the first primary processor) to an input of a next primary processor (e.g., a second primary processor). In yet other cases, the previous primary processor may be the last primary processor in a set or chain of primary processors responsible for performing the task (e.g., a primary task). In some such cases, the step 804 may include providing an output of the previous primary processor to a subsequent system (e.g., the control system 708).

At decision step 806, the method 800 includes determining whether the first primary processor 716 is associated with a fault. Determining whether the first primary processor 716 is associated with a fault may include determining whether an out of the first primary processor 716 satisfies an expected output and/or whether the output is within a threshold range of an expected output. In some cases, determining whether the first primary processor 716 is associated with a fault may include determining whether an error or error code has been generated.

In some embodiments, determining whether the first primary processor 716 is associated with a fault may include determining whether the fault is a transient fault using, for example, the method 600. In some cases, a transient fault may be treated similarly as no fault with respect to the method 800. Further, a determination that a fault is not a transient fault (e.g., is a permanent fault or is a fault that lasts longer than a transient fault) may be treated as a determination that the first primary processor 716 is in a fault state.

If it is determined that the first primary processor 716 is not associated with a fault or is not in a fault state, the method 800 may include performing the step 808 to provide an output of the first primary processor 716 to a subsequent system. The subsequent system can be another primary processor. For example, if the first primary processor is processor 716a, the second primary processor may be 716b and the output of the processor 716a may be provided to the primary processor 716b. Alternatively, as explained above, the subsequent system may be any other processor 716 or may be any other subsequent system, such as the control system 708. As stated above, in some cases, a transient fault may be treated as no fault for purposes of the method 800. However, if the transient fault lasts longer than a threshold period or is later identified as a non-transient fault, then it may be determined that the first primary processor 716 is associated with a fault.

If it is determined at the decision step 806 that the first primary processor 716 is associated with a fault, the method 800 may include performing the step 810 to select a secondary processor 718 to function as a primary processor 716. Selecting the secondary processor 718 to function as the primary processor 716 may include designating the secondary processor 718 as a primary processor. In some embodiments, the selected secondary processor 718 may cease performing secondary tasks. Alternatively, the selected secondary processor 718 may prioritize operations associated with primary tasks or may deprioritize performance of operations associated with secondary tasks. In some cases, the secondary processor 718 is selected based at least in part on the particular primary processor 716 associated with the fault and/or based on available communication connections (e.g., via the cross connector 720) between the secondary processor 718 and previous or subsequent systems that communicate with the primary processor 716 associated with the fault.

At step 812, the method 800 replaces the primary processor 716 associated with the fault with the secondary processor 718 selected at the step 810. Replacing the primary processor with the secondary processor may include providing the first primary input to the secondary processor and/or providing an output from an immediately preceding system (e.g., a prior primary processor in a processing chain) to the secondary processor as an input. Further, the step 812 may include providing an output of the secondary processor to a system (e.g., a processor or a control system 708) that was previously receiving the output of the primary processor 716 associated with the fault. Thus, the secondary processor 718 may serve as a substitute for the faulty primary processor.

In some cases, by substituting the secondary processor for the primary processor, one or more secondary tasks may be slowed down or may no longer be performed. In some cases, the loss or reduction in performance of secondary tasks may be an acceptable trade-off for maintaining operation of primary tasks because, for example, primary tasks may be more important for safe operation of autonomous vehicles than secondary tasks.

In some embodiments, substituting the secondary processor for the primary processor includes designating or otherwise including the secondary processor with the set of processors assigned to perform the primary tasks. In other words, the selected secondary processor 718 may be grouped with the primary processors 716. The secondary processor may remain grouped with the primary processors 716 permanently, until the processor 716 associated with a fault is replaced or repaired, or until the processor 716 is determined to be fault-free or no longer associated with the fault that triggered the substitution of the processor 716 with the processor 718. In some embodiments, upon the primary processor 716 no longer being associated with a fault (e.g., due to repair, replacement, or determination that the fault was transient), the secondary processor 718 may be reconfigured or removed from the set of primary processors and may be configured to function as a secondary processor or included with the secondary processors 718.

In some embodiments, the secondary processor 718 selected to function as a primary processor 716 may continue to perform secondary tasks. In some such cases, the secondary processor 718 may prioritize the primary tasks such that the secondary tasks may be delayed. In other embodiments, the secondary processor 718 selected to function as a primary processor 716 may cease performing secondary tasks. In some such cases, secondary tasks may be performed by the remaining secondary processor 718. These secondary tasks may be performed slower due to the loss of a secondary processor that is being used as a primary processor. In other cases, some secondary tasks may cease to be performed. In some cases, the substitution of the secondary processor 718 for the primary processor 716 associated with a fault may not impact performance of secondary tasks due to extra capacity included in the AV compute 740 and/or due to certain secondary tasks not regularly being performed (e.g., controlling of battery charging may not be performed during vehicle operation on a road network).

Figure 9:
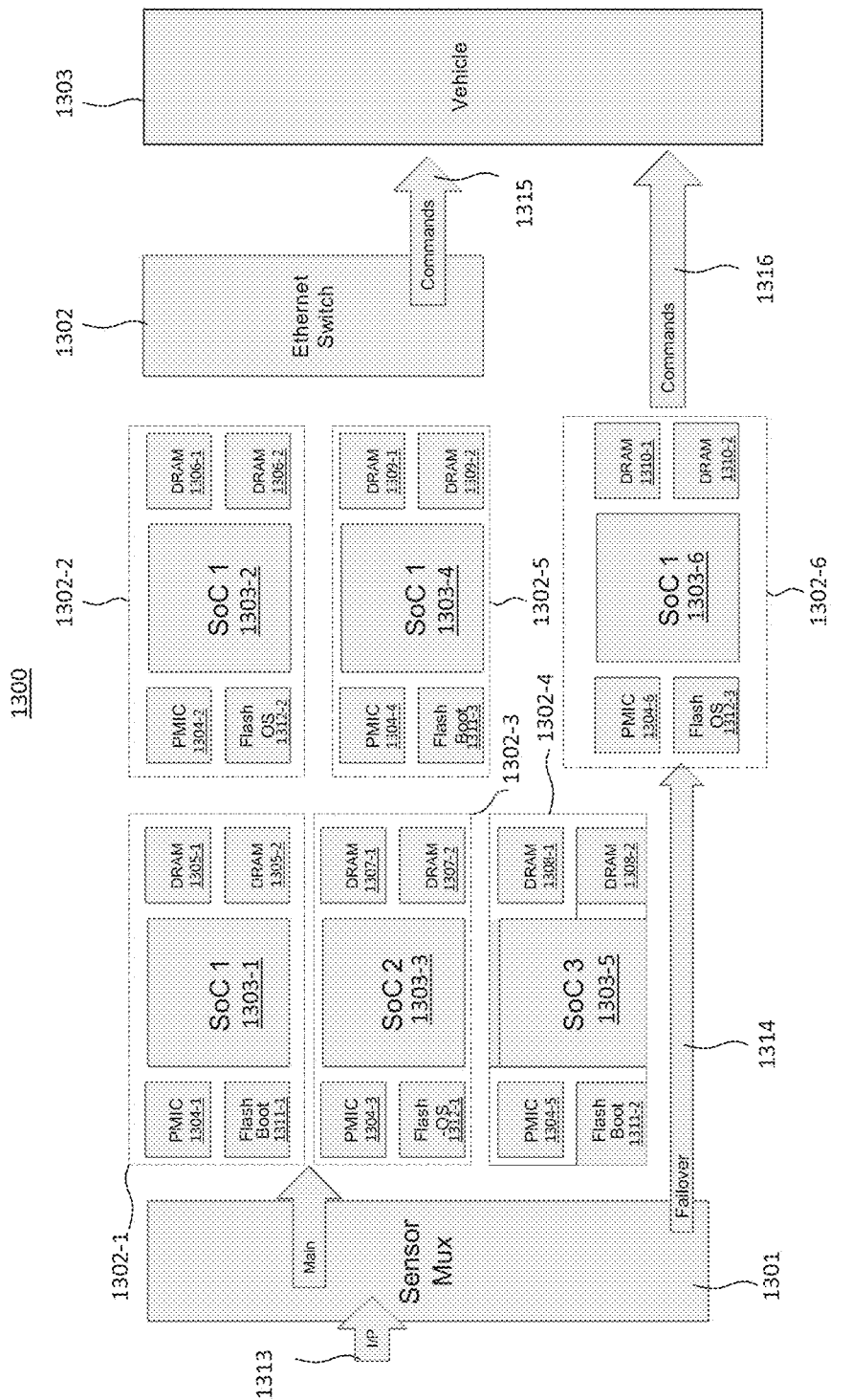
FIG. 9 is a block diagram of an example chip layout of a compute unit for autonomous robotic systems according to this disclosure.

FIG. 9 is a block diagram of an example chip layout of a compute unit 1300 for autonomous robotic systems, such as AV's, in accordance with one or more embodiments. Compute unit 1300 can be implemented in or as part of, for example, an AV compute (e.g., AV compute 202f, 540, 740). Compute unit 1300 includes sensor multiplexer (Mux) 1301, main compute clusters 1302-1 through 1302-5, failover compute cluster 1302-6, and Ethernet switch 1302. Ethernet switch 1302 includes a plurality of Ethernet transceivers for sending commands 1315 or vehicle controls to vehicle 1303. The commands 1315 may be received by one or more of DBW system 202h, safety controller 202g, brake system 208, powertrain control system 204 and/or steering control system 206, as shown in FIG. 2. The commands 1315 can be received by one or more of controls system 508 or control system 708.

A first main compute cluster 1302-1 includes SoC 1303-1, volatile memory 1305-1, 1305-2, power management integrated circuit (PMIC) 1304-1, and flash boot 1311-1. A second main compute cluster 1302-2 includes SoC 1303-2, volatile memory 1306-1, 1306-2 (e.g., DRAM), PMIC 1304-2 and flash Operating System (OS) 1312-2. A third main compute cluster 1302-3 includes SoC 1303-3, volatile memory 1307-1, 1307-2, PMIC 1304-3 and flash OS memory 1312-1. A fourth main compute cluster 1302-4 includes SoC 1303-5, volatile memory 1308-1, 1308-2, PMIC 1304-5 and flash boot memory 1311-2. A fifth main compute cluster 1302-4 includes SoC 1303-4, volatile memory 1309-1, 1309-2, PMIC 1304-4 and flash boot memory 1311-3. Failover compute cluster 1302-6, e.g., implementing failover device 760, includes SoC 1303-6, volatile memory 1310-1, 1310-2, PMIC 1304-6 and flash OS memory 1312-3.

Each of the SoCs 1303-1 through 1303-6 can be a MPSoC. SoCs 1303-1 through 1303-6 can share memory through a cache coherent fabric. It should be understood that the compute unit 1300 is one non-limiting example of a compute unit. For example, the compute unit 1300 may include more or fewer compute clusters and/or Socs.

In some embodiments, the PMICs 1304-1 through 1304-6 can monitor signals on a bus (e.g., a PCIe bus), and communicate with a corresponding memory controller (e.g., memory controller in a DRAM chip) to notify the memory controller of a power mode change, such as a change from a normal mode to a low power mode or a change from the low power mode to the normal mode. In some embodiments, PMICs 1304-1 through 1304-6 can receive communication signals from their respective memory controllers that are monitoring the bus, and can perform operations to prepare the memory for lower power mode. When a memory chip is ready to enter low power mode, the memory controller communicates with its respective slave PMIC to instruct the slave PMIC to initiate the lower power mode.

In some embodiments, sensor mux 1301 receives and multiplexes sensor data (e.g., video data, LiDAR point clouds, RADAR data) from a sensor bus through a sensor interface 1313, which in some embodiments is a low voltage differential signaling (LVDS) interface. In some embodiments, sensor mux 1301 directs or transmits a copy of the video data channels (e.g., Mobile Industry Processor interface (MIPI®) camera serial interface (CSI) channels), which can be sent to failover cluster 1302-6. Failover cluster 1302-6 provides backup to the main compute clusters using video data to operate the AV, such as when one or more main compute clusters 1302-1 fail.

Compute unit 1300 is one non-limiting example of a high-performance compute unit for autonomous robotic systems, such as AV computes, and other embodiments can include more or fewer clusters, and each cluster can have more or fewer SoCs, volatile memory chips, non-volatile memory chips, NPUs, GPUs, and Ethernet switches/transceivers.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Disclosed are non-transitory computer readable media comprising instructions stored thereon that, when executed by at least one processor, cause the at least one processor to carry out operations according to one or more of the methods disclosed herein.

Also disclosed are methods, non-transitory computer readable media, apparatus, and systems according to any of the following clauses:

Clause 1. A method comprising:
  obtaining frame data corresponding to a frame of sensor data associated with an environment within which an autonomous vehicle is operating;
  processing, using a processor, the frame data to determine an output corresponding to a first trajectory value of a trajectory parameter, the first trajectory value associated with a first trajectory of the autonomous vehicle;
  determining at a first time whether a fault parameter indicates a presence of a fault, wherein the determining at the first time is associated with the processing of the frame data; and
  in response to determining that the fault parameter is indicative of the fault being present:
    applying an initial fault scheme;
    reprocessing, using the processor, the frame data to determine an output corresponding to a secondary trajectory value of the trajectory parameter, the secondary trajectory value associated with a second trajectory of the autonomous vehicle;
    determining at a second time whether the fault parameter indicates a presence of the fault, wherein the determination at the second time is based on the reprocessing of the frame data; and
    responsive to the determination of the fault parameter at the second time, providing operating data to a control system configured to control the autonomous vehicle based at least in part on the operating data.

Clause 2. The method of clause 1, wherein applying the initial fault scheme comprises suspending operation of the autonomous vehicle along a trajectory determined by the trajectory parameter.

Clause 3. The method of clause 1, wherein applying the initial fault scheme comprises proceeding along a trajectory determined by the trajectory parameter for a threshold period of time.

Clause 4. The method of clause 3, wherein the threshold period of time corresponds to a length of time at least long enough to reprocess the frame data and to determine whether the fault parameter indicates the presence of the fault at the second time.

Clause 5. The method of one of clauses 3 or 4, wherein the threshold period of time is based at least in part on the environment of the autonomous vehicle.

Clause 6. The method of any one of clauses 1-5, wherein, responsive to the determination of the fault parameter at the second time being indicative of the fault being present, the method further comprises classifying the fault as a non-transient fault.

Clause 7. The method of clause 6, further comprising executing a fault processing scheme.

Clause 8. The method of clause 7, wherein the fault processing scheme comprises providing the operating data to the control system to cause the autonomous vehicle to slow down, pull over, or cease operating.

Clause 9. The method of clause 6, further comprising replacing the processor with a second processor causing the second processor to process the frame data in place of the processor processing the frame data.

Clause 10. The method of clause 9, wherein replacing the processor with the second processor comprises routing, to the second processor, data, commands, or the data and the commands that are addressed to the processor.

Clause 11. The method of any one of clauses 1-5, wherein, responsive to the determination of the fault parameter at the second time being indicative of the fault being absent, the method further comprises classifying the fault as a transient fault and providing the first trajectory value or the second trajectory value as the operating data provided to the control system.

Clause 12. The method of any one of clauses 1-11, wherein the frame data comprises the sensor data.

Clause 13. The method of any one of clauses 1-11, wherein the frame data comprises an output of a second processor that processes the sensor data to generate the frame data.

Clause 14. An autonomous vehicle control system of an autonomous vehicle, the autonomous vehicle control system comprising:
  a trajectory processing system comprising a plurality of processors, the trajectory processing system configured to:
    obtain frame data corresponding to a frame of sensor data associated with an environment within which the autonomous vehicle is operating;
    process, using a processor of the plurality of processors, the frame data to determine an output corresponding to a first trajectory value of a trajectory parameter, the first trajectory value associated with a first trajectory of the autonomous vehicle;
    determine at a first time whether a fault parameter indicates a presence of a fault, wherein the determining at the first time is associated with the processing of the frame data; and
    in response to determining that the fault parameter is indicative of the fault being present:
      apply an initial fault scheme;
      reprocess, using the processor, the frame data to determine an output corresponding to a secondary trajectory value of the trajectory parameter, the secondary trajectory value associated with a second trajectory of the autonomous vehicle;

determine at a second time whether the fault parameter indicates a presence of the fault, wherein the determination at the second time is based on the reprocessing of the frame data; and responsive to the determination of the fault parameter at the second time, provide operating data to a control system configured to control the autonomous vehicle based at least in part on the operating data.

Clause 15. The autonomous vehicle control system of clause 14, wherein applying the initial fault scheme comprises suspending operation of the autonomous vehicle along a trajectory determined by the trajectory parameter.

Clause 16. The autonomous vehicle control system of clause 14, wherein applying the initial fault scheme comprises proceeding along a trajectory determined by the trajectory parameter for a threshold period of time.

Clause 17. The autonomous vehicle control system of clause 16, wherein the threshold period of time corresponds to a length of time at least long enough to reprocess the frame data and to determine whether the fault parameter indicates the presence of the fault at the second time.

Clause 18. The autonomous vehicle control system of one of clauses 16 or 17, wherein the threshold period of time is based at least in part on the environment of the autonomous vehicle.

Clause 19. The autonomous vehicle control system of any one of clauses 14-18, wherein, responsive to the determination of the fault parameter at the second time being indicative of the fault being present, the trajectory processing system is further configured to classify the fault as a non-transient fault.

Clause 20. The autonomous vehicle control system of clause 19, wherein the trajectory processing system is further configured to execute a fault processing scheme.

Clause 21. The autonomous vehicle control system of clause 20, wherein the fault processing scheme comprises providing the operating data to the control system to cause the autonomous vehicle to slow down, pull over, or cease operating.

Clause 22. The autonomous vehicle control system of clause 19, wherein the trajectory processing system is further configured to replace the processor with a second processor of the plurality of processors.

Clause 23. The autonomous vehicle control system of clause 22, wherein replacing the processor with the second processor comprises routing, to the second processor, data, commands, or the data and the commands that are addressed to the processor.

Clause 24. The autonomous vehicle control system of any one of clauses 14-18, wherein, responsive to the determination of the fault parameter at the second time being indicative of the fault being absent, the trajectory processing system is further configured to classify the fault as a transient fault and provide one of the first trajectory value or the second trajectory value as the operating data provided to the control system.

Clause 25. The autonomous vehicle control system of any one of clauses 14-24, wherein the frame data comprises the sensor data.

Clause 26. The autonomous vehicle control system of any one of clauses 14-24, wherein the frame data comprises an output of a second processor that processes the sensor data to generate the frame data.

Clause 27. Non-transitory computer-readable media comprising computer-executable instructions that, when executed by an autonomous vehicle control system, causes the autonomous vehicle control system to:

obtain frame data corresponding to a frame of sensor data associated with an environment within which an autonomous vehicle is operating;

process, using a processor, the frame data to determine an output corresponding to a first trajectory value of a trajectory parameter, the first trajectory value associated with a first trajectory of the autonomous vehicle;

determine at a first time whether a fault parameter indicates a presence of a fault, wherein the determining at the first time is associated with the processing of the frame data; and in response to determining that the fault parameter is indicative of the fault being present:

apply an initial fault scheme;

reprocess, using the processor, the frame data to determine an output corresponding to a secondary trajectory value of the trajectory parameter, the secondary trajectory value associated with a second trajectory of the autonomous vehicle;

determine at a second time whether the fault parameter indicates a presence of the fault, wherein the determination at the second time is based on the reprocessing of the frame data; and responsive to the determination of the fault parameter at the second time, provide operating data to a control system configured to control the autonomous vehicle based at least in part on the operating data.

Clause 28. The non-transitory computer-readable media of clause 27, wherein applying the initial fault scheme comprises suspending operation of the autonomous vehicle along a trajectory determined by the trajectory parameter.

Clause 29. The non-transitory computer-readable media of clause 27, wherein applying the initial fault scheme comprises proceeding along a trajectory determined by the trajectory parameter for a threshold period of time.

Clause 30. The non-transitory computer-readable media of clause 29, wherein the threshold period of time corresponds to a length of time at least long enough to reprocess the frame data and to determine whether the fault parameter indicates the presence of the fault at the second time.

Clause 31. The non-transitory computer-readable media of one of clauses 29 or 30, wherein the threshold period of time is based at least in part on the environment of the autonomous vehicle.

Clause 32. The non-transitory computer-readable media of any one of clauses 27-31, wherein, responsive to the determination of the fault parameter at the second time being indicative of the fault being present, the computer-executable instructions further cause the autonomous vehicle control system to classify the fault as a non-transient fault.

Clause 33. The non-transitory computer-readable media of clause 32, wherein the computer-executable instructions further cause the autonomous vehicle control system to execute a fault processing scheme.

Clause 34. The non-transitory computer-readable media of clause 33, wherein the fault processing scheme comprises providing the operating data to the control system to cause the autonomous vehicle to slow down, pull over, or cease operating.

Clause 35. The non-transitory computer-readable media of clause 32, wherein the computer-executable instructions further cause the autonomous vehicle control system to replace the processor with a second processor of the plurality of processors.

Clause 36. The non-transitory computer-readable media of clause 35, wherein replacing the processor with the second processor comprises routing, to the second processor, data, commands, or the data and the commands that are addressed to the processor.

Clause 37. The non-transitory computer-readable media of any one of clauses 27-31, wherein, responsive to the determination of the fault parameter at the second time being indicative of the fault being absent, the computer-executable instructions further cause the autonomous vehicle control system to classify the fault as a transient fault and provide one of the first trajectory value or the second trajectory value as the operating data provided to the control system.

Clause 38. The non-transitory computer-readable media of any one of clauses 27-37, wherein the frame data comprises the sensor data.

Clause 39. The non-transitory computer-readable media of any one of clauses 27-37, wherein the frame data comprises an output of a second processor that processes the sensor data to generate the frame data.

Also disclosed are methods, non-transitory computer readable media, apparatus, and systems according to any of the following clauses:

Clause 1. An apparatus comprising:
    a first set of processors comprising a first processor and a second processor, the first set of processors configured to execute primary tasks corresponding to control of an autonomous vehicle;
    a second set of processors comprising a third processor and a fourth processor, the second set of processors configured to execute secondary tasks corresponding to the control of the autonomous vehicle;
    a cross connector configured to communicatively couple at least the first processor of the first set of processors with at least the third processor of the second set of processors; and
    a controller configured to detect a fault associated with the first processor, and responsive to detecting the fault associated with the first processor, the controller is further configured to:
        select the third processor from the second set of processors to be a substitute processor for the first processor; and
        configure the cross connector to reroute inputs to the first processor to the substitute processor and to route outputs of the substitute processor to the second processor.

Clause 2. The apparatus of clause 1, wherein the controller designates the third processor to be included in the first set of processors in response to selecting the third processor as the substitute processor.

Clause 3. The apparatus of one of clauses 1 or 2, wherein the controller ceases including the third processor in the second set of processors in response to selecting the third processor as the substitute processor.

Clause 4. The apparatus of any one of clauses 1-3, wherein the third processor is reconfigured to cease executing secondary tasks in response to the controller selecting the third processor as the substitute processor.

Clause 5. The apparatus of any one of clauses 1-4, wherein the controller is further configured to reroute a secondary input addressed to the third processor to the fourth processor, wherein the secondary input is associated with a secondary task.

Clause 6. The apparatus of any one of clauses 1-5, wherein the cross connector comprises a physical crossbar that physically connects at least the first processor with at least the third processor.

Clause 7. The apparatus of any one of clauses 1-6, further comprising a second cross connector configured to connect a sensor to at least one of the cross connector, a processor from the first set of processors, or a processor from the second set of processors.

Clause 8. The apparatus of clause 7, further comprising a splitter configured to provide sensor data from the sensor to a failover device.

Clause 9. The apparatus of clause 8, wherein the splitter is configured to provide the sensor data to the failover device in response to determining that a threshold number of processors of the first set of processors are in a fault state.

Clause 10. The apparatus of any one of clauses 1-9, further comprising a failover device configured to execute a fault processing scheme in response to determining that a threshold number of processors of the first set of processors are in a fault state.

Clause 11. The apparatus of any one of clauses 1-10, wherein the first set of processors are associated with a first data processing pipeline and the second set of processors are associated with a second data processing pipeline.

Clause 12. The apparatus of any one of clauses 1-11, wherein the primary tasks comprise tasks associated with safe movement of the autonomous vehicle.

Clause 13. The apparatus of any one of clauses 1-12, wherein the secondary tasks comprise tasks unrelated to safe movement of the autonomous vehicle.

Clause 14. The apparatus of any one of clauses 1-13, wherein the secondary tasks comprise tasks associated with a lower priority level than the primary tasks.

Clause 15. A method comprising:
    detecting, by a controller, a fault associated with a first processor, wherein the first processor is one of a first set of processors comprising the first processor and a second processor, and wherein the first set of processors are configured to execute primary tasks corresponding to control of an autonomous vehicle; and
    in response to detecting the fault associated with the first processor:
        selecting, by the controller, a third processor from a second set of processors to be a substitute processor for the first processor, wherein the second set of processors comprise the third processor and a fourth processor, and wherein the second set of processors are configured to execute secondary tasks corresponding to the control of the autonomous vehicle; and
        configuring a cross connector to reroute inputs to the first processor to the substitute processor and to route outputs of the substitute processor to the second processor, wherein the cross connector is configured to communicatively couple at least the first processor of the first set of processors with at least the third processor of the second set of processors.

Clause 16. The method of clause 15, further comprising designating the third processor to be included in the first set of processors in response to selecting the third processor as the substitute processor.

Clause 17. The method of one of clauses 15 or 16, further comprising ceasing to include the third processor in the second set of processors in response to selecting the third processor as the substitute processor.

Clause 18. The method of any one of clauses 15-17, further comprising ceasing executing secondary tasks in response to selecting the third processor as the substitute processor.

Clause 19. The method of any one of clauses 15-18, further comprising rerouting a secondary input addressed to the third processor to the fourth processor, wherein the secondary input is associated with a secondary task.

Clause 20. The method of any one of clauses 15-19, wherein the cross connector comprises a physical crossbar that physically connects at least the first processor with at least the third processor.

Clause 21. The method of any one of clauses 15-20, further comprising connecting, by a second cross connector, a sensor to at least one of the cross connector, a processor from the first set of processors, or a processor from the second set of processors.

Clause 22. The method of clause 21, further comprising providing, by a splitter, sensor data from the sensor to a failover device.

Clause 23. The method of clause 22, wherein the splitter is configured to provide the sensor data to the failover device in response to determining that a threshold number of processors of the first set of processors are in a fault state.

Clause 24. The method of any one of clauses 15-23, further comprising executing, by a failover device, a fault processing scheme in response to determining that a threshold number of processors of the first set of processors are in a fault state.

Clause 25. The method of any one of clauses 15-24, wherein the first set of processors are associated with a first data processing pipeline and the second set of processors are associated with a second data processing pipeline.

Clause 26. The method of any one of clauses 15-25, wherein the primary tasks comprise tasks associated with safe movement of the autonomous vehicle.

Clause 27. The method of any one of clauses 15-26, wherein the secondary tasks comprise tasks unrelated to safe movement of the autonomous vehicle.

Clause 28. The method of any one of clauses 15-27, wherein the secondary tasks comprise tasks associated with a lower priority level than the primary tasks.

Clause 29. Non-transitory computer-readable media comprising computer-executable instructions that, when executed by an autonomous vehicle control system, causes the autonomous vehicle control system to:
 detect, by a controller of the autonomous vehicle control system, a fault associated with a first processor, wherein the first processor is one of a first set of processors comprising the first processor and a second processor, and wherein the first set of processors are configured to execute primary tasks corresponding to control of an autonomous vehicle; and
 in response to detecting the fault associated with the first processor:
  select, by the controller, a third processor from a second set of processors to be a substitute processor for the first processor, wherein the second set of processors comprise the third processor and a fourth processor, and wherein the second set of processors are configured to execute secondary tasks corresponding to the control of the autonomous vehicle; and
  configure a cross connector to reroute inputs to the first processor to the substitute processor and to route outputs of the substitute processor to the second processor, wherein the cross connector is configured to communicatively couple at least the first processor of the first set of processors with at least the third processor of the second set of processors.

Clause 30. The non-transitory computer-readable media of clause 29, wherein the computer-executable instructions further cause the autonomous vehicle control system to designate the third processor to be included in the first set of processors in response to selecting the third processor as the substitute processor.

Clause 31. The non-transitory computer-readable media of one of clauses 29 or 30, wherein the computer-executable instructions further cause the autonomous vehicle control system to cease including the third processor in the second set of processors in response to selecting the third processor as the substitute processor.

Clause 32. The non-transitory computer-readable media of any one of clauses 29-31, wherein the computer-executable instructions further cause the autonomous vehicle control system to cease executing secondary tasks in response to selecting the third processor as the substitute processor.

Clause 33. The non-transitory computer-readable media of any one of clauses 29-32, wherein the computer-executable instructions further cause the autonomous vehicle control system to reroute a secondary input addressed to the third processor to the fourth processor, and wherein the secondary input is associated with a secondary task.

Clause 34. The non-transitory computer-readable media of any one of clauses 29-33, wherein the cross connector comprises a physical crossbar that physically connects at least the first processor with at least the third processor.

Clause 35. The non-transitory computer-readable media of any one of clauses 29-34, wherein the computer-executable instructions further cause the autonomous vehicle control system to connect, by a second cross connector, a sensor to at least one of the cross connector, a processor from the first set of processors, or a processor from the second set of processors.

Clause 36. The non-transitory computer-readable media of clause 35, wherein the computer-executable instructions further cause the autonomous vehicle control system to provide, by a splitter, sensor data from the sensor to a failover device.

Clause 37. The non-transitory computer-readable media of clause 36, wherein the splitter is configured to provide the sensor data to the failover device in response to determining that a threshold number of processors of the first set of processors are in a fault state.

Clause 38. The non-transitory computer-readable media of any one of clauses 29-37, wherein the computer-executable instructions further cause the autonomous vehicle control system to execute, by a failover device, a fault processing scheme in response to determining that a threshold number of processors of the first set of processors are in a fault state.

Clause 39. The non-transitory computer-readable media of any one of clauses 29-38, wherein the first set of processors are associated with a first data processing pipeline and the second set of processors are associated with a second data processing pipeline.

Clause 40. The non-transitory computer-readable media of any one of clauses 29-39, wherein the primary tasks comprise tasks associated with safe movement of the autonomous vehicle.

Clause 41. The non-transitory computer-readable media of any one of clauses 29-40, wherein the secondary tasks comprise tasks unrelated to safe movement of the autonomous vehicle.

Clause 42. The non-transitory computer-readable media of any one of clauses 29-41, wherein the secondary tasks comprise tasks associated with a lower priority level than the primary tasks.

Additional Examples

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
    obtaining frame data corresponding to a frame of sensor data associated with an environment within which an autonomous vehicle is operating;
    processing, using a processor, the frame data to determine an output corresponding to a first trajectory value of a trajectory parameter, the first trajectory value associated with a first trajectory of the autonomous vehicle;
    determining at a first time whether a fault parameter indicates a presence of a fault, wherein the determining at the first time is associated with the processing of the frame data; and
    in response to determining that the fault parameter is indicative of the fault being present:
        applying an initial fault scheme;
        reprocessing, using the processor, the frame data to determine an output corresponding to a secondary trajectory value of the trajectory parameter, the secondary trajectory value associated with a second trajectory of the autonomous vehicle;
        determining at a second time whether the fault parameter indicates a presence of the fault, wherein the determination at the second time is based on the reprocessing of the frame data; and
        responsive to the determination of the fault parameter at the second time, providing operating data to a control system configured to control the autonomous vehicle based at least in part on the operating data.

2. The method of claim 1, wherein applying the initial fault scheme comprises suspending operation of the autonomous vehicle along a trajectory determined by the trajectory parameter.

3. The method of claim 1, wherein applying the initial fault scheme comprises proceeding along a trajectory determined by the trajectory parameter for a threshold period of time.

4. The method of claim 3, wherein the threshold period of time corresponds to a length of time at least long enough to reprocess the frame data and to determine whether the fault parameter indicates the presence of the fault at the second time.

5. The method of claim 3, wherein the threshold period of time is based at least in part on the environment of the autonomous vehicle.

6. The method of claim 1, wherein, responsive to the determination of the fault parameter at the second time being indicative of the fault being present, the method further comprises classifying the fault as a non-transient fault.

7. The method of claim 6, further comprising executing a fault processing scheme.

8. The method of claim 7, wherein the fault processing scheme comprises providing the operating data to the control system to cause the autonomous vehicle to slow down, pull over, or cease operating.

9. The method of claim 6, further comprising replacing the processor with a second processor causing the second processor to process the frame data in place of the processor processing the frame data.

10. The method of claim 9, wherein replacing the processor with the second processor comprises routing, to the second processor, data, commands, or the data and the commands that are addressed to the processor.

11. The method of claim 1, wherein, responsive to the determination of the fault parameter at the second time being indicative of the fault being absent, the method further comprises classifying the fault as a transient fault and providing the first trajectory value or the second trajectory value as the operating data provided to the control system.

12. The method of claim 1, wherein the frame data comprises the sensor data.

13. The method of claim 1, wherein the frame data comprises an output of a second processor that processes the sensor data to generate the frame data.

14. An autonomous vehicle control system of an autonomous vehicle, the autonomous vehicle control system comprising:
    a trajectory processing system comprising a plurality of processors, the trajectory processing system configured to:
        obtain frame data corresponding to a frame of sensor data associated with an environment within which the autonomous vehicle is operating;
        process, using a processor of the plurality of processors, the frame data to determine an output corresponding to a first trajectory value of a trajectory parameter, the first trajectory value associated with a first trajectory of the autonomous vehicle;
        determine at a first time whether a fault parameter indicates a presence of a fault, wherein the determining at the first time is associated with the processing of the frame data; and
        in response to determining that the fault parameter is indicative of the fault being present:
            apply an initial fault scheme;
            reprocess, using the processor, the frame data to determine an output corresponding to a secondary trajectory value of the trajectory parameter, the secondary trajectory value associated with a second trajectory of the autonomous vehicle;
            determine at a second time whether the fault parameter indicates a presence of the fault, wherein the determination at the second time is based on the reprocessing of the frame data; and
            responsive to the determination of the fault parameter at the second time, provide operating data to a control system configured to control the autonomous vehicle based at least in part on the operating data.

15. The autonomous vehicle control system of claim 14, wherein applying the initial fault scheme comprises proceeding along a trajectory determined by the trajectory parameter for a threshold period of time that is at least long enough to reprocess the frame data and to determine whether the fault parameter indicates the presence of the fault at the second time.

16. The autonomous vehicle control system of claim 14, wherein, responsive to the determination of the fault parameter at the second time being indicative of the fault being present, the trajectory processing system is further configured to classify the fault as a non-transient fault.

17. The autonomous vehicle control system of claim 16, wherein, in response to classifying the fault as a non-transient fault, the trajectory processing system is further configured to execute a fault processing scheme comprising providing the operating data to the control system to cause the autonomous vehicle to slow down, pull over, or cease operating.

18. The autonomous vehicle control system of claim 16, wherein the trajectory processing system is further configured to replace the processor with a second processor of the plurality of processors.

19. The autonomous vehicle control system of claim 14, wherein, responsive to the determination of the fault parameter at the second time being indicative of the fault being absent, the trajectory processing system is further configured to classify the fault as a transient fault and provide one of the first trajectory value or the second trajectory value as the operating data provided to the control system.

* * * * *